(12) United States Patent
Kitamoto

(10) Patent No.: US 10,029,255 B2
(45) Date of Patent: Jul. 24, 2018

(54) LIQUID HANDLING DEVICE

(71) Applicant: Enplas Corporation, Saitama (JP)

(72) Inventor: Ken Kitamoto, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/117,030

(22) PCT Filed: Feb. 10, 2015

(86) PCT No.: PCT/JP2015/053650
§ 371 (c)(1),
(2) Date: Aug. 5, 2016

(87) PCT Pub. No.: WO2015/119290
PCT Pub. Date: Aug. 13, 2015

(65) Prior Publication Data
US 2017/0173583 A1    Jun. 22, 2017

(30) Foreign Application Priority Data
Feb. 10, 2014  (JP) .................................. 2014-023510

(51) Int. Cl.
*B01L 3/00*    (2006.01)
(52) U.S. Cl.
CPC ..... *B01L 3/502738* (2013.01); *B01L 3/50273* (2013.01); *B01L 3/502715* (2013.01);
(Continued)
(58) Field of Classification Search
CPC ......... B01L 3/502738; B01L 3/502715; B01L 3/50273; B01L 2300/0848
See application file for complete search history.

(56) References Cited

U.S. PATENT DOCUMENTS 6,406,605 B1     6/2002   Moles
2004/0209354 A1  10/2004  Mathies
(Continued)

FOREIGN PATENT DOCUMENTS

JP    2001-304440 A    10/2001
JP    2002-228033 A    8/2002
(Continued)

OTHER PUBLICATIONS

International Search Report from International Application No. PCT/JP2015/053650 dated Mar. 10, 2015.
(Continued)

*Primary Examiner* — Samuel P Siefke
(74) *Attorney, Agent, or Firm* — Brundidge & Stanger, P.C.

(57) ABSTRACT

This liquid handling device is provided with a first chip that comprises a first substrate, a first film, a first flow path, a second flow path and a partition wall. A diaphragm portion of the first film is over the first flow path, the second flow path and the partition wall, and the center thereof is arranged over the first flow path. The first chip comprises a discharge hole or a discharge flow path which, in the liquid flow direction in the first flow path, opens into the first flow path between the partition wall and the center of the diaphragm and allows communication between the inside and outside of the first flow path.

6 Claims, 16 Drawing Sheets

(52) U.S. Cl.
CPC ............ *B01L 2200/0684* (2013.01); *B01L 2300/0816* (2013.01); *B01L 2300/0848* (2013.01); *B01L 2300/0887* (2013.01); *B01L 2300/14* (2013.01); *B01L 2400/0481* (2013.01)

(56) References Cited

U.S. PATENT DOCUMENTS

| | | |
|---|---|---|
| 2007/0053796 A1 | 3/2007 | Gau et al. |
| 2012/0128549 A1 | 5/2012 | Zhou et al. |

FOREIGN PATENT DOCUMENTS

| | | | |
|---|---|---|---|
| JP | 2004-33919 | A | 2/2004 |
| JP | 2005-337415 | A | 12/2005 |
| JP | 2009-510337 | A | 3/2009 |
| JP | 2010-230529 | A | 10/2010 |
| JP | 2011-30522 | A | 2/2011 |
| JP | 2013-047672 | * | 7/2011 |
| WO | 2013/014905 | A1 | 1/2013 |

OTHER PUBLICATIONS

Extended European Search Report for 15745813.4 dated Aug. 14, 2017.

* cited by examiner

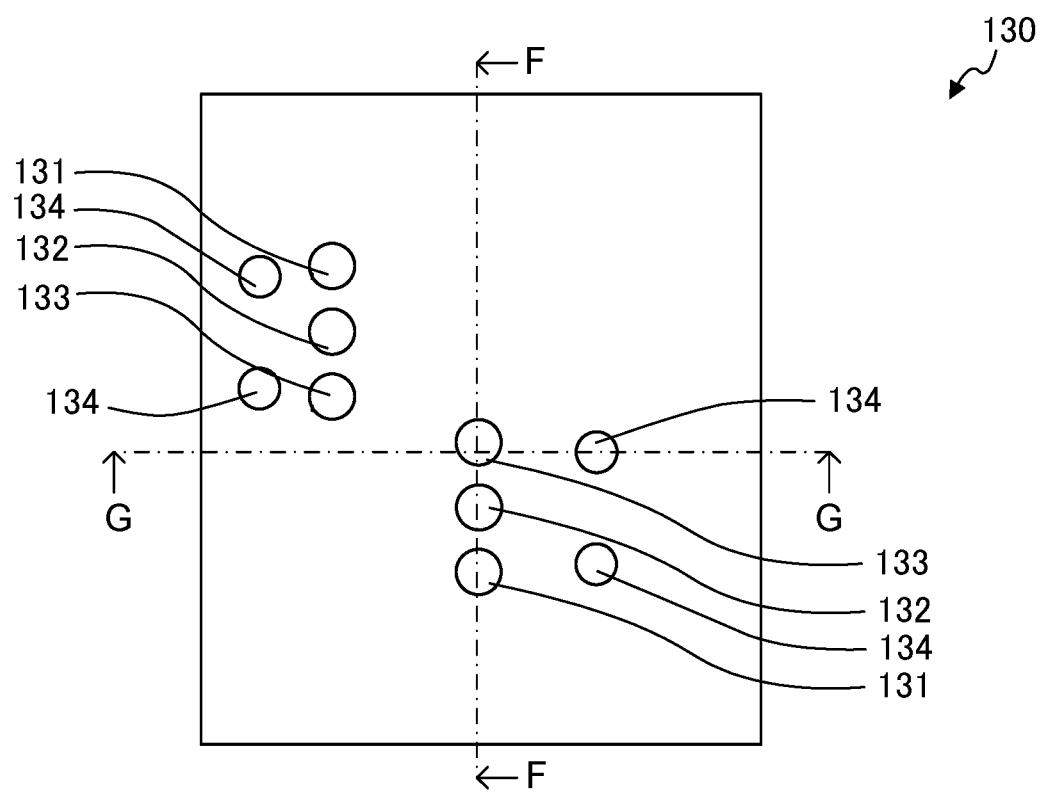
FIG. 7A
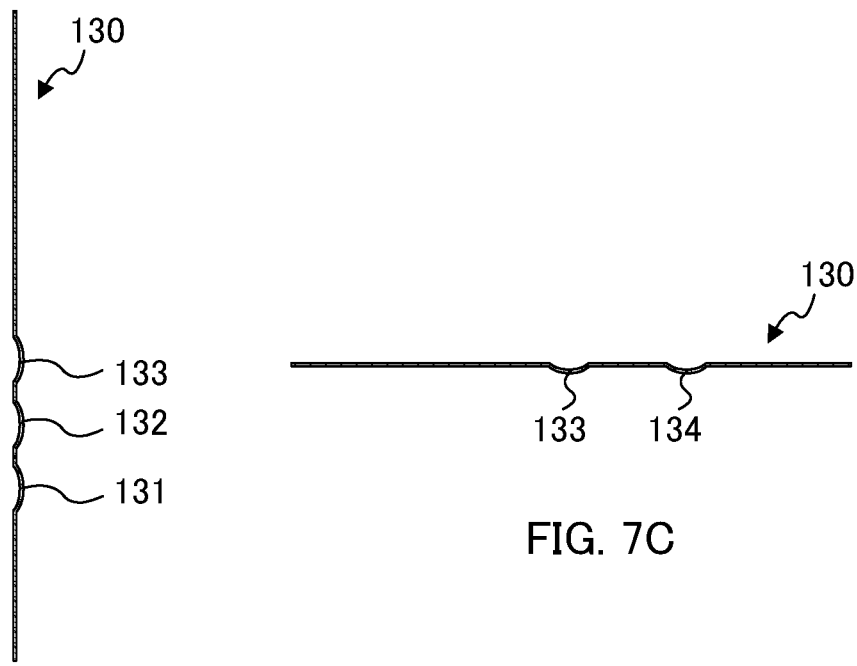
FIG. 7B
FIG. 7C

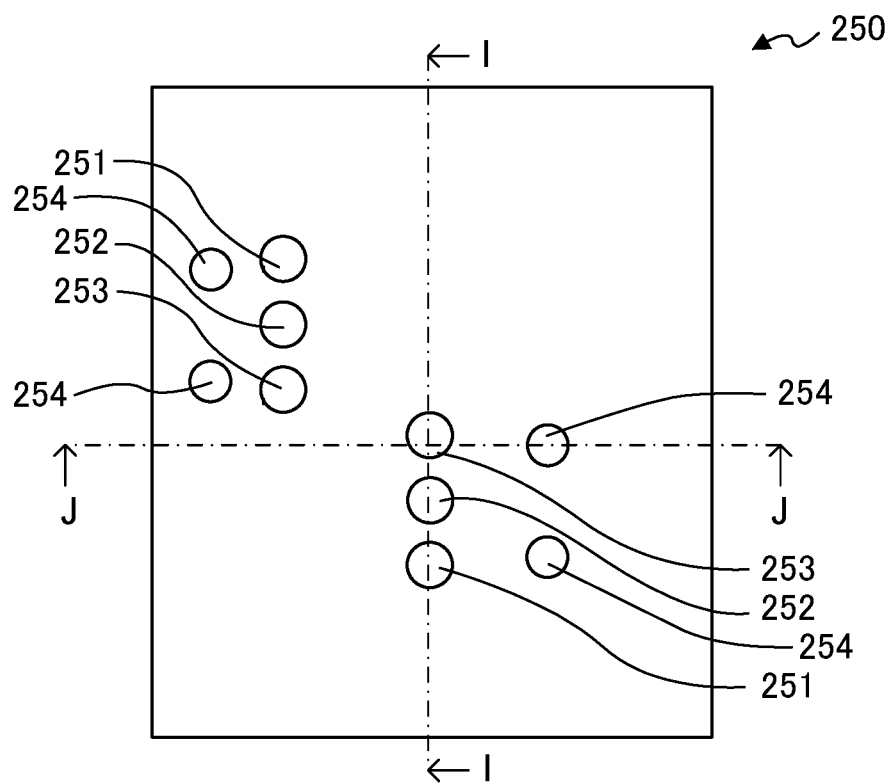
FIG. 10A
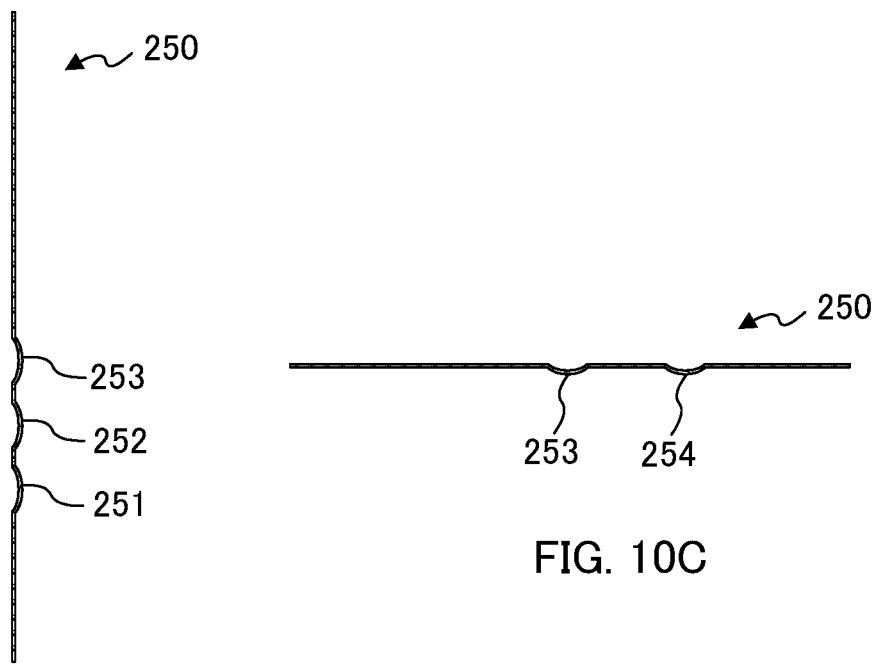
FIG. 10B
FIG. 10C

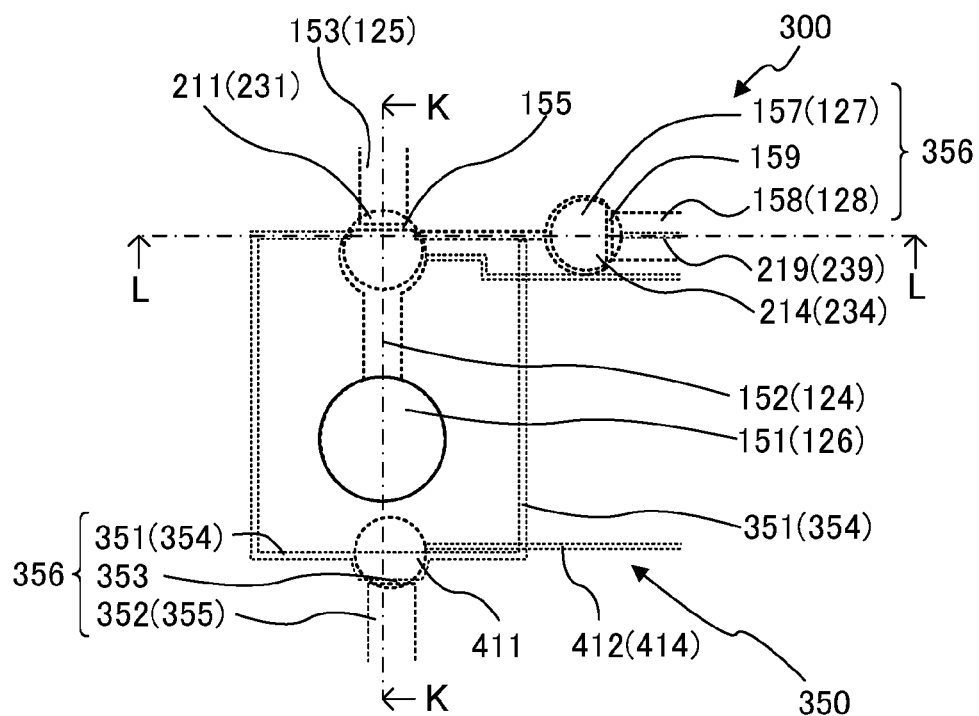
FIG. 13A
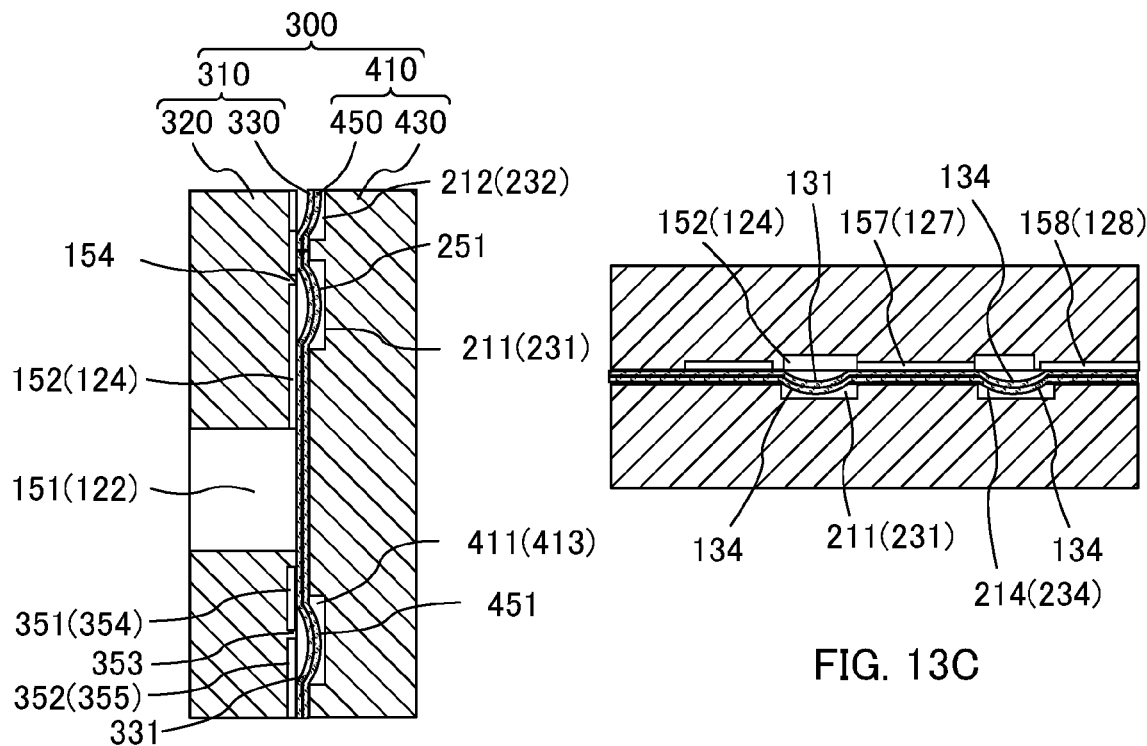
FIG. 13B
FIG. 13C

LIQUID HANDLING DEVICE

TECHNICAL FIELD

The present invention relates to a liquid handling device which is used for analysis and processing of a liquid sample and the like.

BACKGROUND ART

In recent years, microchannel chips have been used to accurately and speedily analyze a trace substance such as protein and nucleic acid. Microchannel chips advantageously allow the amount of reagents or samples to be small, and are expected to be used for various uses such as laboratory tests, food tests, and environment tests.

It has been proposed to provide a micro valve in a microchannel chip to automate the process using microchannel chips (see, for example, PTL 1).

FIG. 1A and FIG. 1B illustrate a configuration of micro valve 10 disclosed in PTL 1. FIG. 1A is a plan view of micro valve 10 disclosed in PTL 1, and FIG. 1B is a sectional view taken along line a-a of FIG. 1A. As illustrated in FIG. 1A and FIG. 1B, PTL 1 discloses micro valve 10 including substrate 20 which is a flat plate, first layer 30 stacked on substrate 20, and second layer 40 stacked on first layer 30. First layer 30 includes first groove 31, first valve groove 32 communicated with first groove 31, second groove 33, second valve groove 34 communicated with second groove 33, and valve 35 disposed between first valve groove 32 and second valve groove 34. When first layer 30 is stacked on substrate 20, first groove 31, first valve groove 32, second valve groove 34 and second groove 33 respectively form first channel 36, first valve chamber 37, second valve chamber 38 and second channel 39. Second layer 40 includes, on a surface facing first layer 30, recess 41 whose shape in a plan view has a size greater than the size of the external shape of first valve chamber 37 and second valve chamber 38. When second layer 40 is stacked on first layer 30, recess 41 forms pressure chamber 42.

In micro valve 10 disclosed in PTL 1, when the pressure in pressure chamber 42 is increased, first layer 30 is pushed toward substrate 20, and valve 35 makes contact with substrate 20, thus stopping the fluid flow from first valve chamber 37 to second valve chamber 38. On the other hand, when the pressure in pressure chamber 42 is released, first layer 30 is sucked into recess 41, and first layer 30 bends toward recess 41. As a result, a gap is formed between substrate 20 and valve 35, and fluid flows from first valve chamber 37 toward second valve chamber 38.

When liquid is used as fluid which is supplied to the channel in disclosed in PTL 1, the liquid is sent from first channel 36 to the channel with valve 35 opened. By capillary action or external pressure, the liquid flows from first channel 36 to second channel 39 through a gap between valve 35 and substrate 20. Then, valve 35 is appropriately opened and closed as described above.

CITATION LIST

Patent Literature

PTL 1
Japanese Patent Application Laid-Open No. 2005-337415

SUMMARY OF INVENTION

Technical Problem

FIG. 1C is a sectional view taken along line b-b of FIG. 1A. As illustrated in FIG. 1A and FIG. 1C, the distance between first layer 30 and substrate 20 at an outer periphery portion of first valve chamber 37 is smaller than the distance between first layer 30 and substrate 20 at a center portion of first valve chamber 37. Accordingly, when liquid is sent to the channel from first channel 36 side, first valve chamber 37 is filled with liquid in order from an outer periphery portion of first valve chamber 37 where capillarity easily occurs. Then, before the center portion of first valve chamber 37 is filled with the liquid, the liquid further advances in such a manner as to turn around along the outer periphery portion of first valve chamber 37 where capillarity easily occurs. As a result, disadvantageously, bubbles remain in first valve chamber 37.

An object of the present invention is to provide a fluid handling device which can fill a liquid channel with liquid without allowing bubbles to remain in the liquid channel.

Solution to Problem

A liquid handling device according to an embodiment of the present invention includes a first chip, the first chip including: a first substrate having, on one surface thereof, a first groove located on an upstream side in a direction in which liquid flows, a second groove located on a downstream side in the direction in which liquid flows, and a partition wall disposed between the first groove and the second groove; and a first film configured to cover the partition wall, one end of the first groove on the partition wall side, and one end of the second groove on the partition wall side, and including a diaphragm part whose center is located on the first groove, the diaphragm part having a circular shape in plan view, the first film being bonded on the one surface of the first substrate except for the diaphragm part. A liquid channel and a discharge hole or a discharge channel are formed in the first chip, the liquid channel including a first channel disposed on the first groove side and configured of the first groove, the partition wall and the first film, and a second channel disposed on the second groove side and configured of the second groove, the partition wall and the first film, the discharge hole or the discharge channel being configured to open at the first channel between a center of the diaphragm part and the partition wall in a direction in which liquid flows in the first channel, and communicate between inside and outside of the first channel.

Advantageous Effects of Invention

According to the present invention, it is possible to provide a fluid handling device which can fill a liquid channel with liquid without allowing bubbles to remain in the liquid channel

BRIEF DESCRIPTION OF DRAWINGS

FIG. 7A to FIG. 7C illustrate a configuration of a first film;

FIG. 10A to FIG. 10C illustrate a configuration of a second film;

FIG. 13A to FIG. 13C illustrate a configuration of a fluid handling device according to a modification of Embodiment 1;

DESCRIPTION OF EMBODIMENTS

In the following, embodiments of the present invention are described in detail with reference to the accompanying drawings. In the following description, a microchannel chip will be described as an example of a liquid handling device of the embodiments of the present invention.

Embodiment 1

(Configuration of Microchannel Chip)

Figure 1A:
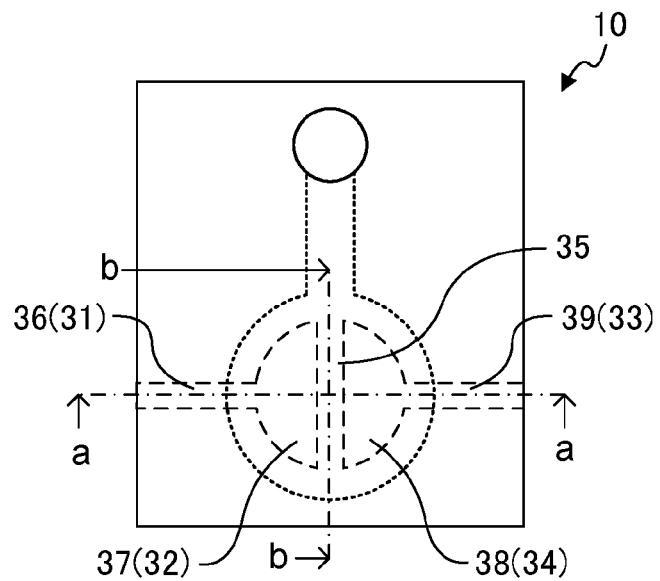
FIG. 1A to FIG. 1C illustrate a configuration of the micro valve disclosed in PTL 1.
Figure 1B:
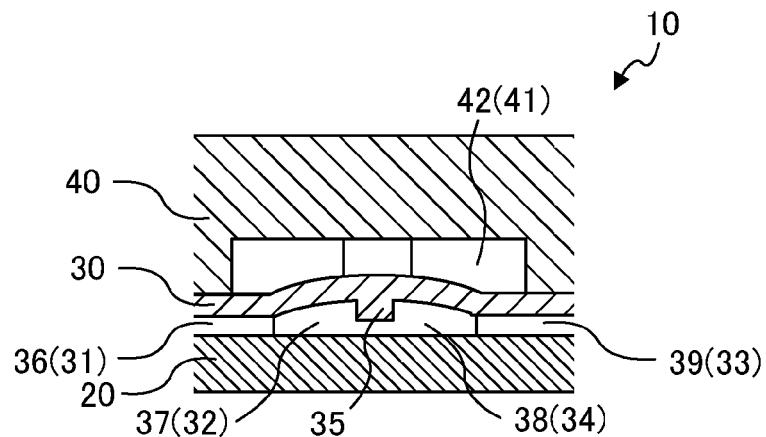
Figure 1C:
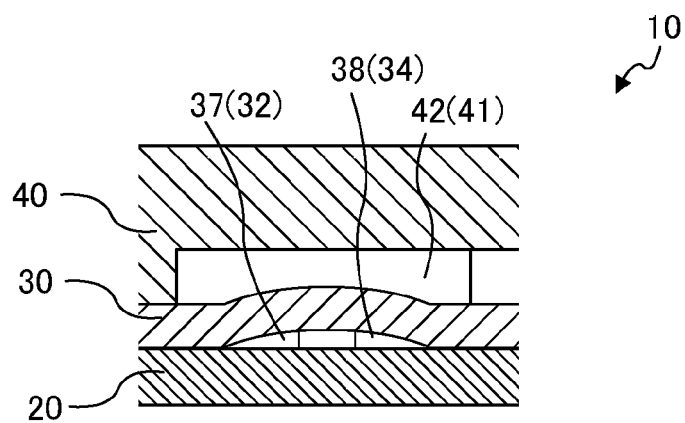
Figure 2:
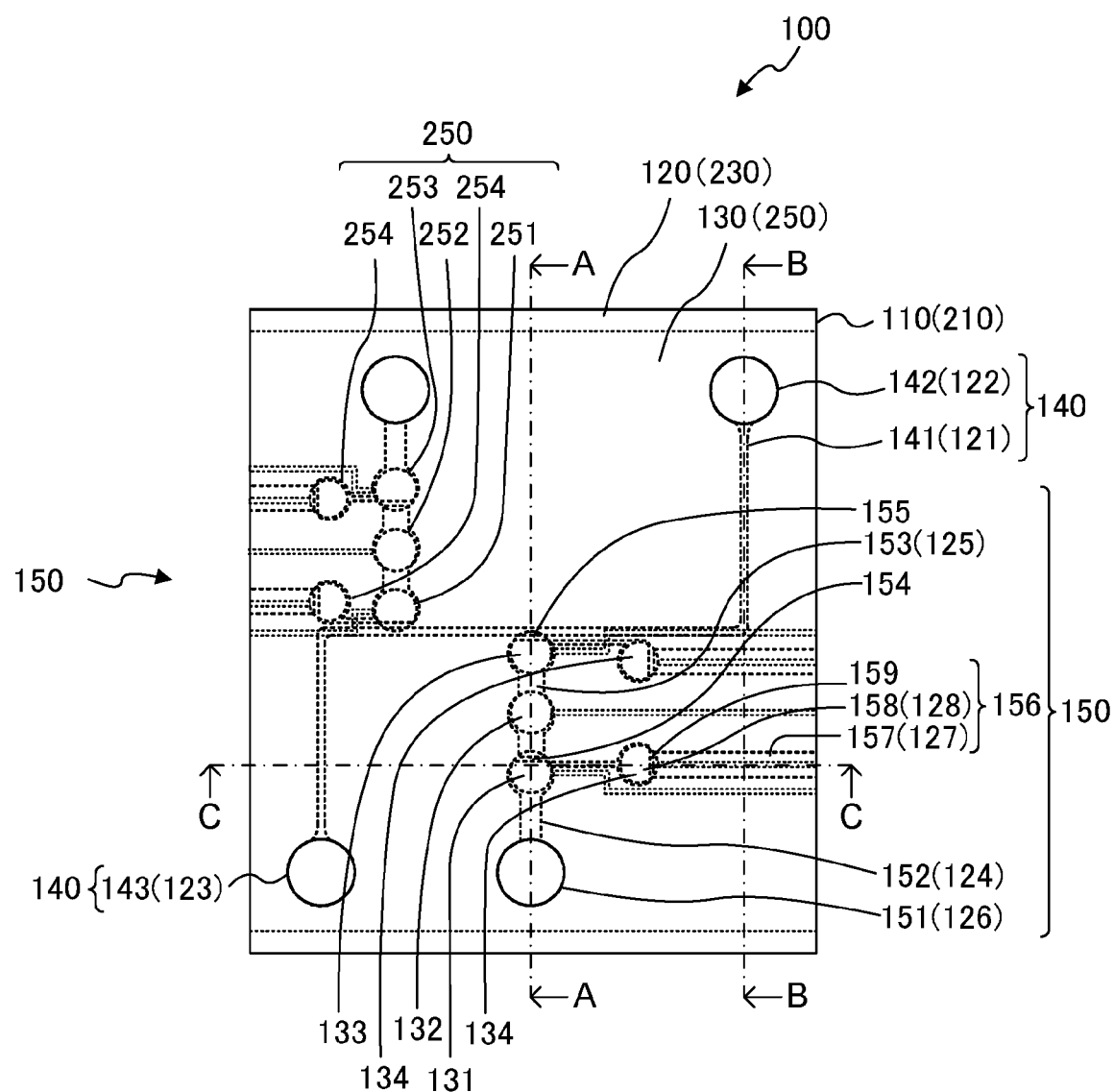
FIG. 2 illustrates a configuration of a fluid handling device according to Embodiment 1 of the present invention.
Figure 3A:
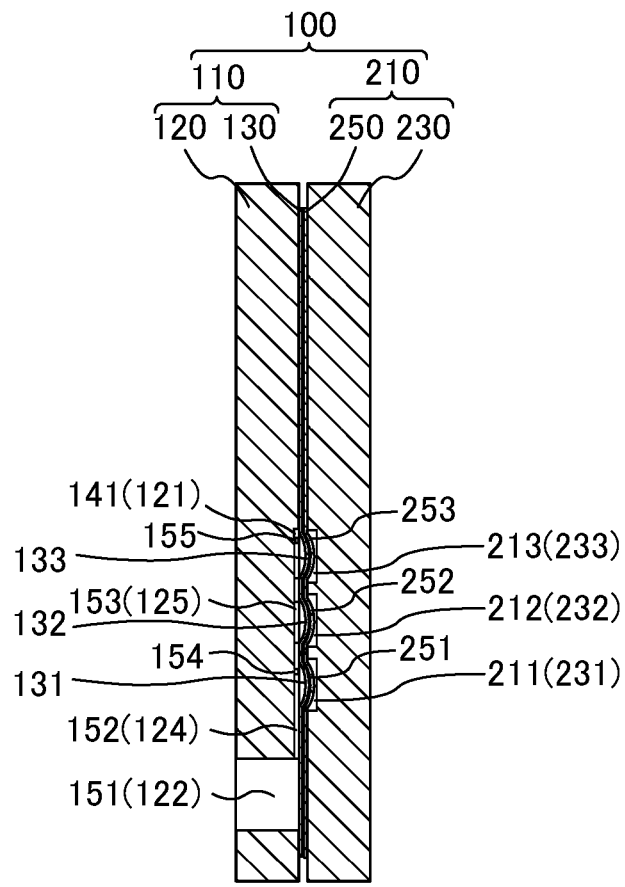
FIG. 3A to FIG. 3C are sectional views of the fluid handling device.
Figure 3B:
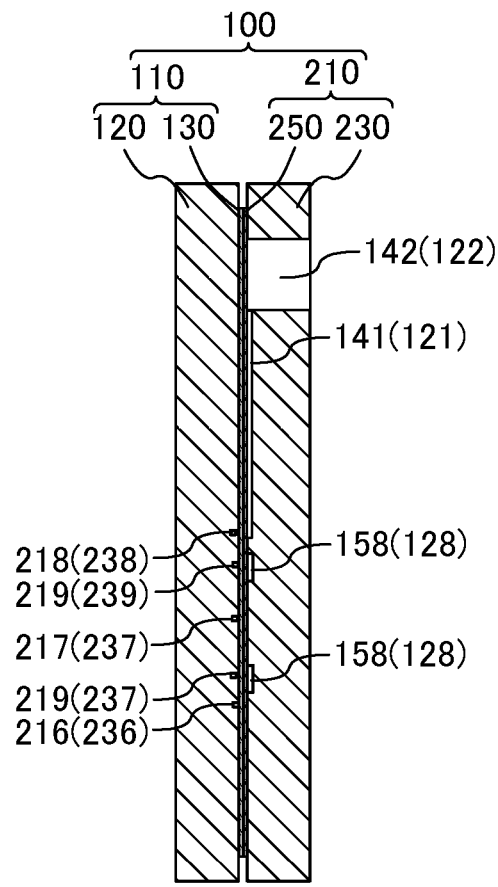
Figure 3C:
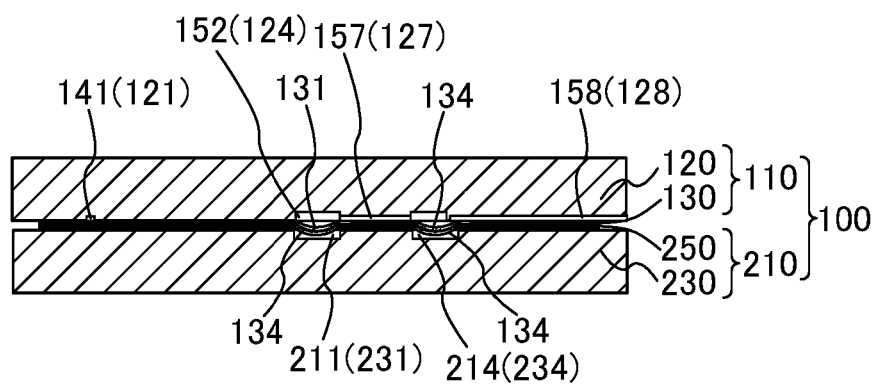

FIG. 2 and FIG. 3A to FIG. 3C illustrate a configuration of microchannel chip 100 according to Embodiment 1 of the present invention. FIG. 2 is a plan view of microchannel chip 100. FIG. 3A is a sectional view taken along line A-A of FIG. 2, FIG. 3B is a sectional view taken along line B-B of FIG. 2, and FIG. 3C is a sectional view taken along line C-C of FIG. 2.

As illustrated in FIG. 2 and FIG. 3A to FIG. 3C, microchannel chip 100 includes first chip 110 having main channel part 140 and addition part 150, and second chip 210 stacked on first chip 110. First chip 110 includes first substrate 120 having partition walls 154, 155 and 159, and first film 130, and second chip 210 includes second substrate 230 having recesses 231, 233 and 234, and second film 250. When in use, first chip 110 and second chip 210 are stacked in such a manner that first film 130 and second film 250 face the inner side (see FIG. 3A to FIG. 3C). At this time, the surface of first film 130 is in close contact with the surface of second film 250. Further, partition walls 154, 155 and 159 and recesses 231, 233 and 234 are respectively disposed to face each other with first film 130 and second film 250 therebetween (see FIG. 3A to FIG. 3C).

First chip 110 is a chip in which fluid such as reagent and liquid sample flows. Deflective displaceable regions are formed at positions corresponding to partition walls 154, 155 and 159 in first film 130. The deflective displaceable regions function as diaphragm parts 131, 133 and 134 (valve elements) of a micro valve for controlling the fluid flow in first chip 110. Second chip 210 functions as an actuator of the micro valve.

(First Chip)

Figure 4A:
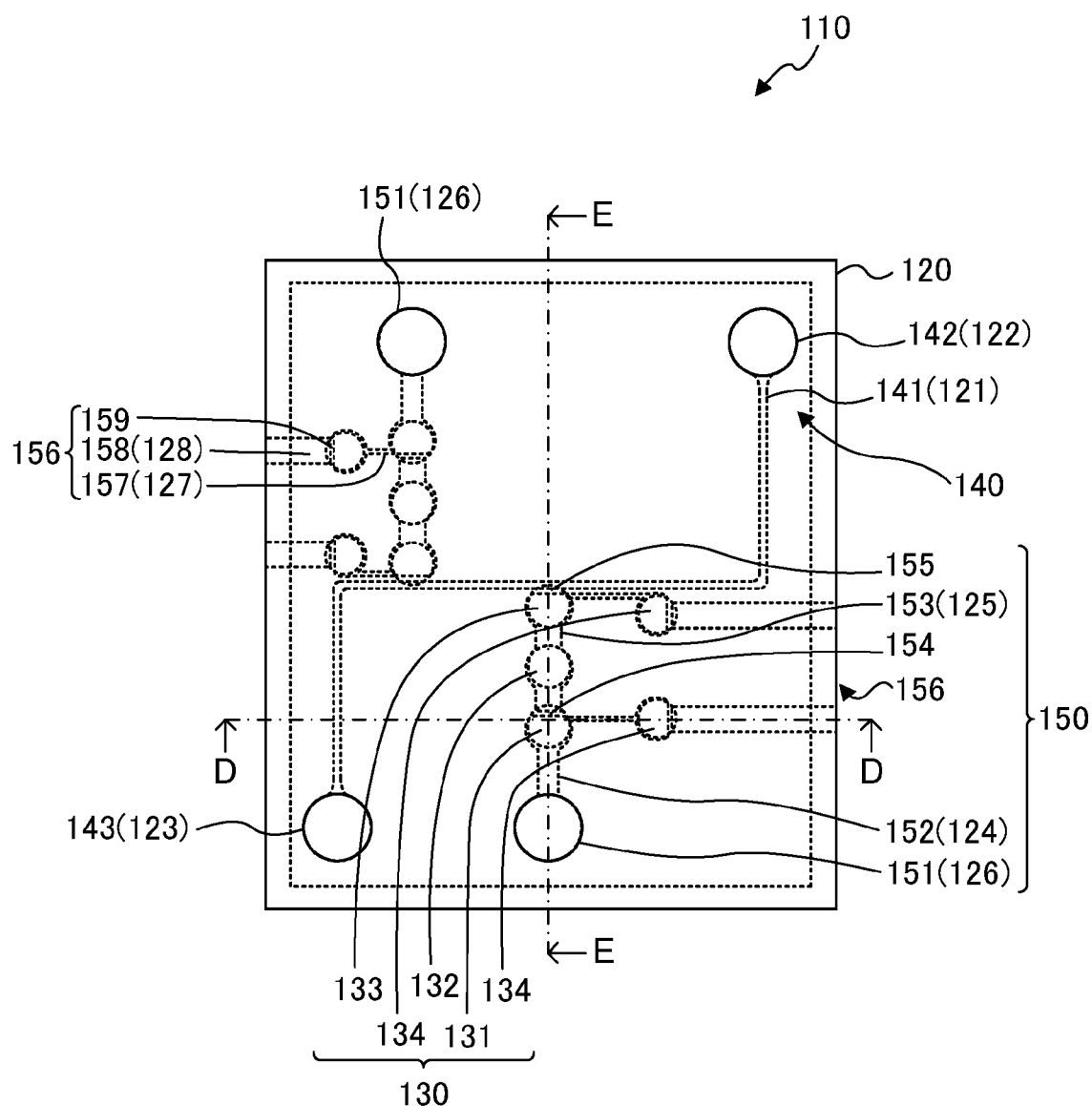
FIG. 4A and FIG. 4B illustrate a configuration of a first chip.
Figure 4B:
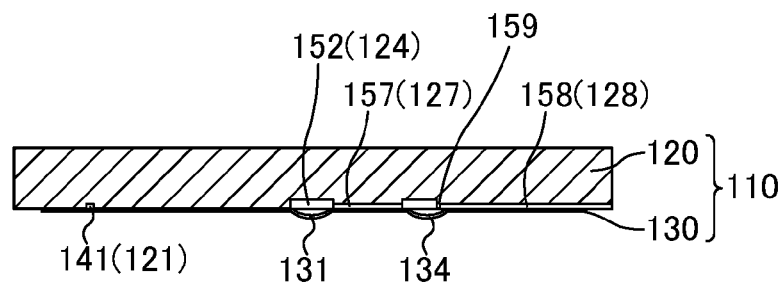
Figure 5A:
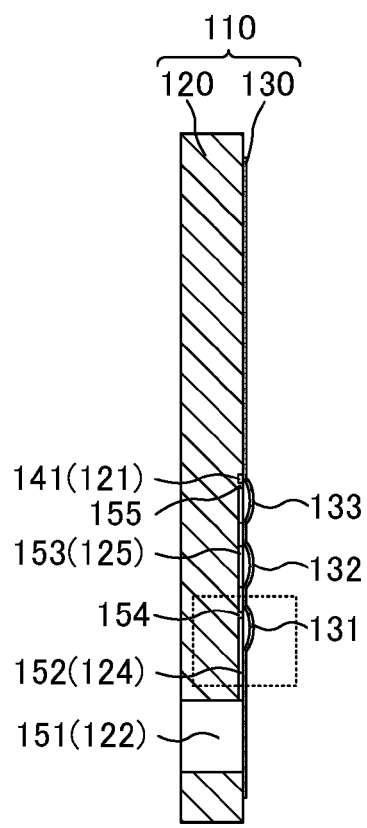
FIG. 5A to FIG. 5C are a sectional view and enlarged views of a main part.
Figure 5B:
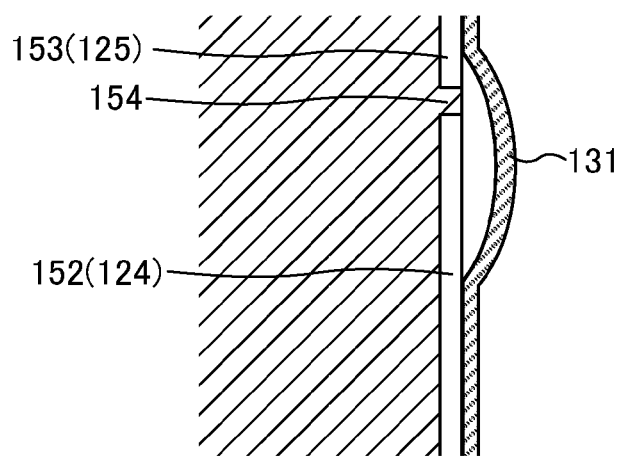
Figure 5C:
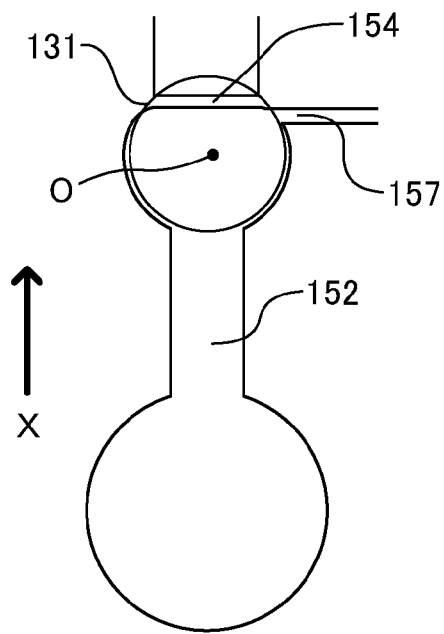

FIG. 4A to FIG. 5C illustrate a configuration of first chip 110. FIG. 4A is a plan view of first chip 110, and FIG. 4B is a sectional view taken along line D-D of FIG. 4A. FIG. 5A is a sectional view taken along line E-E of FIG. 4A, FIG. 5B is an enlarged view of a region surrounded by the broken line in FIG. 5A, and FIG. 5C is a plan view including the region surrounded by the broken line in FIG. 5A, in which all configurations of first substrate 120 and first film 130 to be stacked are illustrated with solid lines.

First chip 110 is a chip for flowing of liquid. First chip 110 is composed of first substrate 120 and first film 130. First chip 110 includes main channel part 140 and addition part 150.

Main channel part 140 is a channel for flowing of reagent and liquid sample (hereinafter referred to also as "reagent"). Main channel part 140 includes main flow path 141, reagent inlet 142 and reagent outlet 143.

One end of main flow path 141 is communicated with reagent inlet 142 for introducing reagent. In addition, the other end of main flow path 141 is communicated with reagent outlet 143 for ejecting reagent. The cross-sectional area and the cross-sectional shape of main flow path 141 are not limited. For example, main channel 141 is a channel in which fluid can move by capillary action. In this case, main flow path 141 has a substantially rectangular cross-sectional shape with each side (width and depth) of about several tens of micrometers, for example. As used herein, the "cross-section of the channel" means the cross-section of the channel orthogonal to the flow direction of the liquid (fluid). In addition, the positions of main flow path 141, reagent inlet 142 and reagent outlet 143 in first chip 110 are not limited. The reagent introduced from reagent inlet 142 flows to reagent outlet 143 through main flow path 141.

Addition part 150 adds test chemical liquid and the like to the reagent flowing through main flow path 141, as necessary. The number and position of addition part 150 is not limited. In the present embodiment, addition part 150 is disposed on the upstream side and the downstream side (in total, two addition parts 150 are disposed) (see FIG. 4A). Addition part 150 disposed on the upstream side of main flow path 141, and that disposed on the downstream side of main flow path 141 have the same configuration. For such a configuration, addition part 150 disposed on the upstream side of main flow path 141 is described below.

Addition part 150 includes liquid inlet 151, first channel 152, second channel 153, a plurality of partition walls 154 and 155, and a plurality of ejection parts 156.

First channel 152 and second channel 153 form a liquid channel First partition wall 154 is disposed between first channel 152 and second channel 153, and second partition wall 155 is disposed between second channel 153 and main flow path 141. One end of first channel 152 is communicated with liquid inlet 151. In addition, first partition wall 154 is disposed at the other end of first channel 152. First partition wall 154 is disposed at one end of second channel 153. In addition, second partition wall 155 is disposed at the other end of second channel 153. First partition wall 154 and first film 130 communicate between first channel 152 and second channel 153 when the micro valve is in an open state. In addition, second partition wall 155 and first film 130 communicate between second channel 153 and main flow path 141 when the micro valve is in an open state. The liquid introduced from liquid inlet 151 flows through liquid channels (first channel 152 and second channel 153) and is then added to the reagent flowing in main flow path 141.

The cross-sectional areas and the cross-sectional shapes of first channel 152 and second channel 153 are not limited. For example, first channel 152 and second channel 153 are channels in which fluid can move by capillary action. In this case, first channel 152 and second channel 153 have a substantially rectangular cross-sectional shape with each side (width and depth) of about several tens of micrometers. In addition, the cross-sectional areas and the cross-sectional shapes of first channel 152 and second channel 153 may be identical to each other or may be different from each other. It is to be noted that, in the present embodiment, a downstream end part of first channel 152, an intermediate part of second channel 153, and a downstream end part of second channel 153 have a large cross-sectional area such that incoming liquid can be stored.

First partition wall 154 and second partition wall 155 function as a valve seat of the micro valve. First partition wall 154 is disposed between first channel 152 and second channel 153. In addition, second partition wall 155 is disposed between second channel 153 and main flow path 141. The sizes and the shapes in a plan view of first partition wall 154 and second partition wall 155 are not limited as long as the function as the valve seat of the micro valve can be ensured. In the present embodiment, the sizes of first partition wall 154 and second partition wall 155 in the cross-sectional direction of the channel are respectively identical to those of the cross-sectional shapes of the downstream end part of first channel 152 and the downstream end part of second channel 153.

Ejection part 156 removes bubbles from first channel 152 and second channel 153. One feature of microchannel chip 100 according to the present embodiment is the configuration of removing bubbles from first channel 152 and second channel 153 with ejection part 156. The number of ejection part 156 is not limited. In the present embodiment, ejection part 156 is connected at the downstream end part of first channel 152, and at the downstream end part of second channel 153 (see FIG. 4A). It is to be noted that ejection part 156 connected at the downstream end part of first channel 152 and ejection part 156 connected at the downstream end part of second channel 153 have the same configuration. For such a configuration, ejection part 156 connected at the downstream end part of first channel 152 is described below.

Ejection part 156 includes third channel 157, fourth channel 158 and third partition wall 159.

Third channel 157 and fourth channel 158 form a discharge channel. Third partition wall 159 is disposed between third channel 157 and fourth channel 158. One end of third channel 157 is communicated with a downstream end of first channel 152. In addition, third partition wall 159 is disposed at the other end of third channel 157. Third partition wall 159 is disposed at one end of fourth channel 158. In addition, the other end of fourth channel 158 opens at a side surface (or to the outside) of first substrate 120. Third partition wall 159 and first film 130 communicate between third channel 157 and fourth channel 158 when the micro valve is in an open state. When the liquid channel is filled with liquid, the bubbles in first channel 152 are pushed by the flow end of the liquid and discharged through the discharge channel (third channel 157).

As illustrated in FIG. 5B and FIG. 5C, an upstream end of third channel 157 opens at first channel 152 between center O of first diaphragm part 131 and first partition wall 154 in flow direction X of liquid in first channel 152 (see, the arrow of FIG. 5C). In addition, third channel 157 and fourth channel 158 are formed on a surface of first substrate 120 on first film 130 side.

The cross-sectional areas and the cross-sectional shapes of third channel 157 and fourth channel 158 are not limited. For example, third channel 157 and fourth channel 158 are channels through which fluid can move by capillary action. In this case, third channel 157 and fourth channel 158 have a substantially rectangular cross-sectional shape with each side (width and depth) of about several tens of micrometers, for example. It is to be noted that, in the present embodiment, a downstream end part of third channel 157 is formed to have a large cross-sectional area, and can store incoming liquid.

Figure 6:
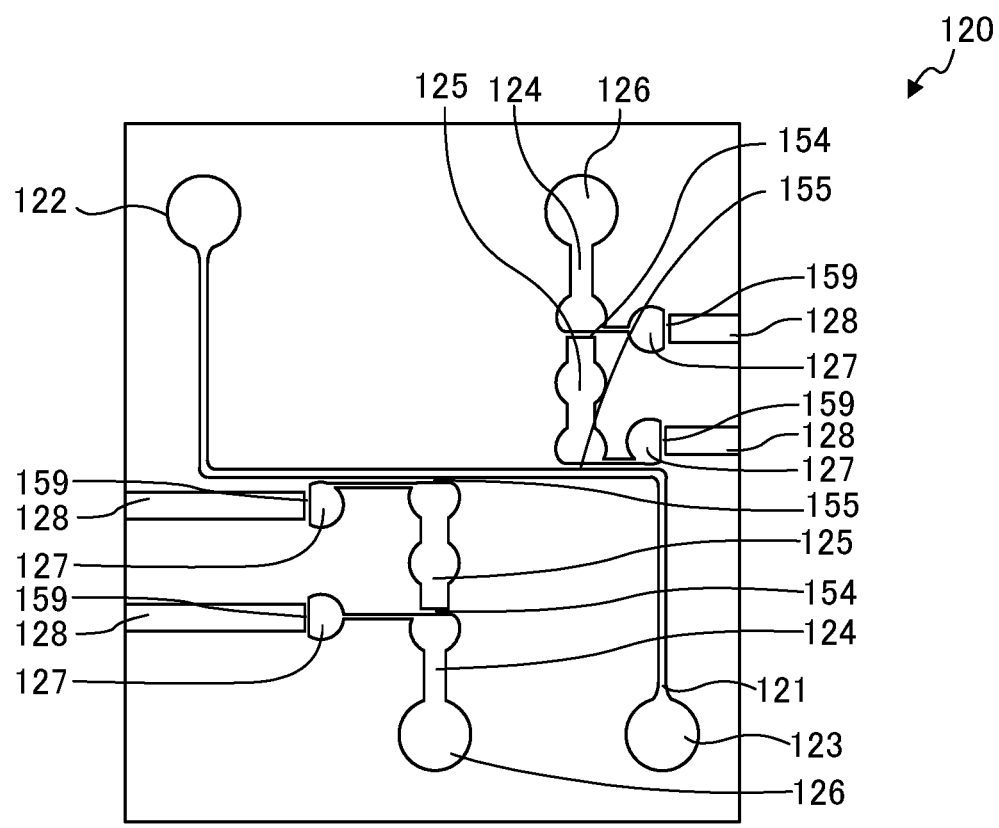
FIG. 6 is a bottom view of a first substrate.

FIG. 6 is a bottom view of first substrate 120. As illustrated in FIG. 6, first substrate 120 is a substantially rectangular transparent resin substrate. The thickness of first substrate 120 is not limited. The thickness of first substrate 120 is, for example, 1 to 10 mm. In addition, the type of the resin of first substrate 120 is not limited, and may be appropriately selected from publicly known resins. Examples of the resin of first substrate 120 include polyethylene terephthalate, polycarbonate, polymethylmethacrylate, vinyl chloride, polypropylene, polyether, polyethylene, polystyrene, silicone resin, elastomer and the like.

First substrate 120 includes main groove 121, first through hole 122, second through hole 123, first groove 124, second groove 125, first partition wall 154, second partition wall 155, third through hole 126, third groove 127, fourth groove 128 and third partition wall 159.

One end of main groove 121 is communicated with first through hole 122. In addition, the other end of main groove 121 is communicated with second through hole 123. When one opening part of first through hole 122, the opening part of main groove 121, and one opening part of second through hole 123 are closed with first film 130, reagent inlet 142, main flow path 141 and reagent outlet 143 are formed (see FIG. 4A to FIG. 5C).

One end of first groove 124 is communicated with third through hole 126. In addition, first partition wall 154 is disposed at the other end of first groove 124. First partition wall 154 is disposed at one end of second groove 125. In addition, second partition wall 155 is disposed at the other end of second groove 125. When one opening part of third through hole 126, the opening part of first groove 124, and the opening part of second groove 125 are closed with first film 130, liquid inlet 151, first channel 152 and second channel 153 (liquid channel) are formed (see FIG. 4A to FIG. 5C).

One end of third groove 127 is communicated with first groove 124. In addition, third partition wall 159 is disposed at the other end of third groove 127. Third partition wall 159 is disposed at one end of fourth groove 128. In addition, the other end of fourth groove 128 opens at the side wall of first substrate 120. When the opening part of third groove 127 and the opening part of fourth groove 128 are closed with first film 130, third channel 157 and fourth channel 158 (discharge channel) are formed (see FIG. 4A to FIG. 5C).

FIG. 7A to FIG. 7C illustrate a configuration of first film 130. FIG. 7A is a plan view of first film 130, FIG. 7B is a sectional view taken along line F-F of FIG. 7A, and FIG. 7C is a sectional view taken along line G-G of FIG. 7A.

First film 130 is a substantially rectangular transparent resin film. First film 130 is bonded on a surface of first substrate 120 on second chip 210 side. First film 130 includes a plurality of diaphragm parts each having a substantially spherical cap shape (first diaphragm part 131, second diaphragm part 132, third diaphragm part 133, and fourth diaphragm part 134) (displaceable regions). Each of diaphragm parts 131, 132, 133 and 134 is disposed at a position corresponding to addition part 150. To be more specific, first diaphragm part 131 is disposed at a position corresponding to first partition wall 154 in first film 130. Second diaphragm part 132 is disposed at a position corresponding to a position between first partition wall 154 and second partition wall 155 in first film 130. Third diaphragm part 133 is disposed at a position corresponding to second partition wall 155 in first film 130. Fourth diaphragm part 134 is disposed at a position corresponding to third partition wall 159 in first film 130. First film 130 functions as a valve element (diaphragm) of the micro valve having a diaphragm structure. In the state where first film 130 is bonded on first substrate 120, first film 130 (first diaphragm part 131, third diaphragm part 133 and fourth diaphragm part 134) is separated from first partition wall 154, second partition wall 155 and third partition wall 159.

The type of the resin of first film 130 is not limited as long as first film 130 can function as a valve element (diaphragm), and may be appropriately selected from publicly known resins. Examples of the resin of first film 130 include polyethylene terephthalate, polycarbonate, polymethylmethacrylate, vinyl chloride, polypropylene, polyether, polyethylene, polystyrene, and silicone resin.

The thickness of first film 130 is not limited as long as first film 130 can function as a valve element (diaphragm), and may be appropriately set in accordance with the type (stiffness) of the resin. In the present embodiment, first film 130 has a thickness of about 20 μm. In addition, diaphragm parts 131, 133 and 134 have sizes which can cover first partition wall 154, second partition wall 155 and third partition wall 159 and can be housed in first recess 231, third recess 233 and fourth recess 234 when first chip 110 and second chip 210 are stacked on each other. In addition, the external shape of first film 130 is appropriately designed such that a required function can be ensured.

(Second Chip)

Figure 8A:
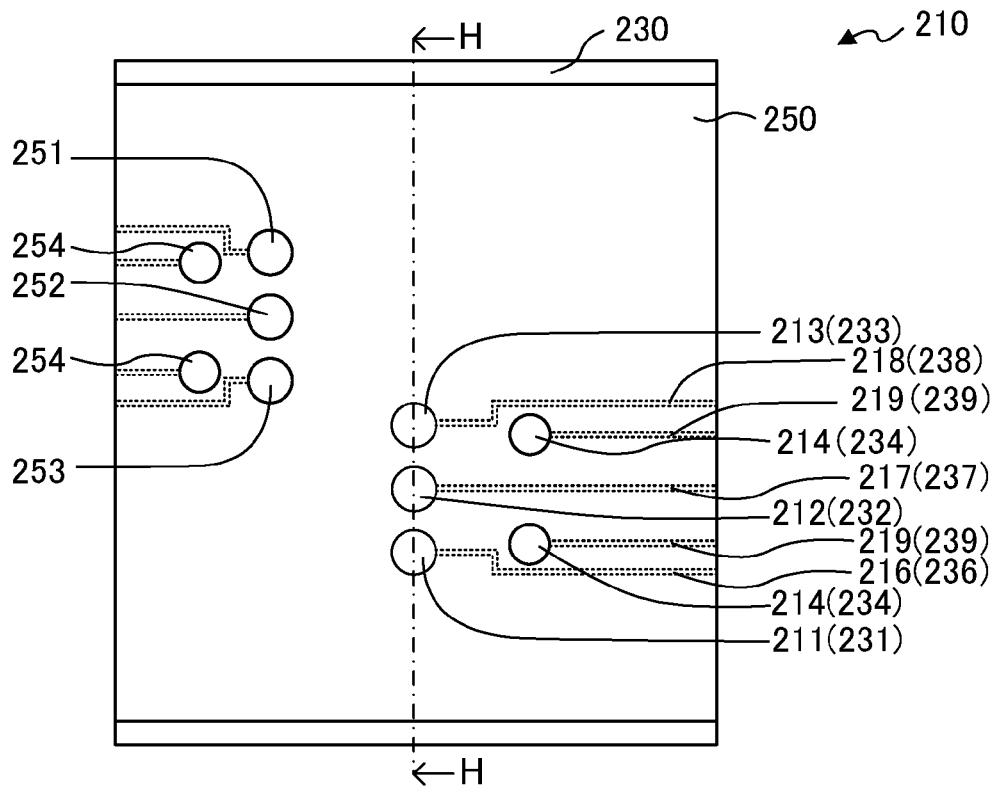
FIG. 8A and FIG. 8B illustrate a configuration of a second chip.
Figure 8B:
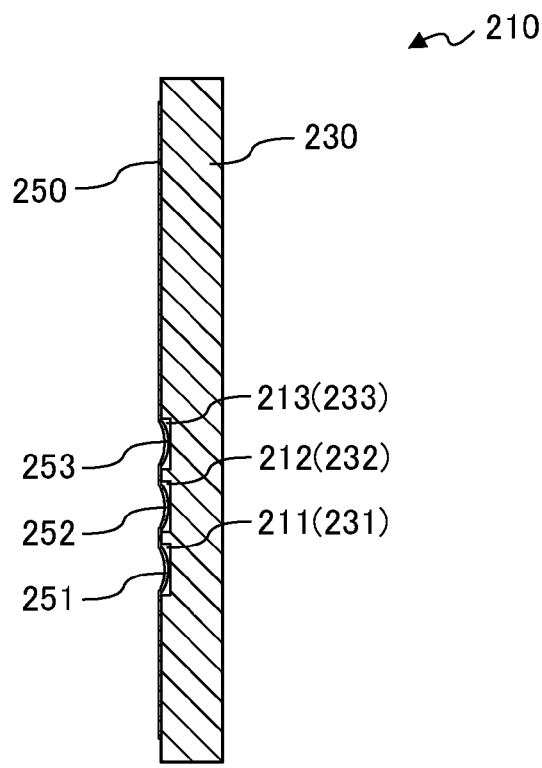

FIG. 8A and FIG. 8B illustrate a configuration of second chip 210. FIG. 8A is a plan view of second chip 210, and FIG. 8B is a sectional view taken along line H-H of FIG. 8A.

As illustrated in FIG. 8A and FIG. 8B, second chip 210 is composed of second substrate 230 and second film 250. Second chip 210 includes a plurality of pressure chambers (first pressure chamber 211, second pressure chamber 212, third pressure chamber 213 and fourth pressure chamber 214) and a plurality of communication paths (first communication path 216, second communication path 217, third communication path 218 and fourth communication path 219). Second film 250 is bonded on one surface of second substrate 230.

First pressure chamber 211 is communicated with the outside of second substrate 230 through first communication path 216. First pressure chamber 211 has a size which can house fifth diaphragm part 251 of second film 250. Second pressure chamber 212 is communicated with the outside of second substrate 230 through second communication path 217. Second pressure chamber 212 has a size which can house sixth diaphragm part 252 of second film 250. Third pressure chamber 213 is communicated with the outside of second substrate 230 through third communication path 218. Third pressure chamber 213 has a size which can house seventh diaphragm part 253 of second film 250. Fourth pressure chamber 214 is communicated with the outside of second substrate 230 through fourth communication path 219. Fourth pressure chamber 214 has a size which can house eighth diaphragm part 254 of second film 250.

The shapes of first pressure chamber 211, second pressure chamber 212, third pressure chamber 213 and fourth pressure chamber 214 are not limited. In the present embodiment, each of first pressure chamber 211, second pressure chamber 212, third pressure chamber 213 and fourth pressure chamber 214 has a substantially columnar shape. In addition, the diameters and the depths of first pressure chamber 211, second pressure chamber 212, third pressure chamber 213 and fourth pressure chamber 214 are also not limited, and may be appropriately set. In the present embodiment, the diameters and the depths of first pressure chamber 211, second pressure chamber 212, third pressure chamber 213 and fourth pressure chamber 214 are identical to each other.

One end of first communication path 216 is communicated with first pressure chamber 211. One end of second communication path 217 is communicated with second pressure chamber 212. One end of third communication path 218 is communicated with third pressure chamber 213. One end of fourth communication path 219 is communicated with fourth pressure chamber 214. In addition, the other ends of communication paths 216, 217, 218 and 219 open at the side surface of second substrate 230. The other ends of communication paths 216, 217, 218 and 219 may not open at the side surface of second substrate 230. For example, the other ends of communication paths 216, 217, 218 and 219 may open at the other surface of second substrate 230 (whose one surface is a surface on which second film 250 is bonded) through through holes respectively formed on second substrate 230 and communicated with the other ends of communication paths 216, 217, 218 and 219.

The cross-sectional areas and the cross-sectional shapes of first communication path 216, second communication path 217, third communication path 218 and fourth communication path 219 are not limited. For example, first communication path 216, second communication path 217, third communication path 218 and fourth communication path 219 are channels through which fluid can move. In this case, each of first communication path 216, second communication path 217, third communication path 218 and fourth communication path 219 has a substantially rectangular cross-sectional shape with each side (width and depth) of about several tens of micrometers, for example. In addition, the cross-sectional areas and the cross-sectional shapes of first communication path 216, second communication path 217, third communication path 218 and fourth communication path 219 may be identical to each other or different from each other. In the present embodiment, the cross-sectional areas and the cross-sectional shapes of first communication path 216, second communication path 217, third communication path 218 and fourth communication path 219 are identical to each other.

Figure 9:
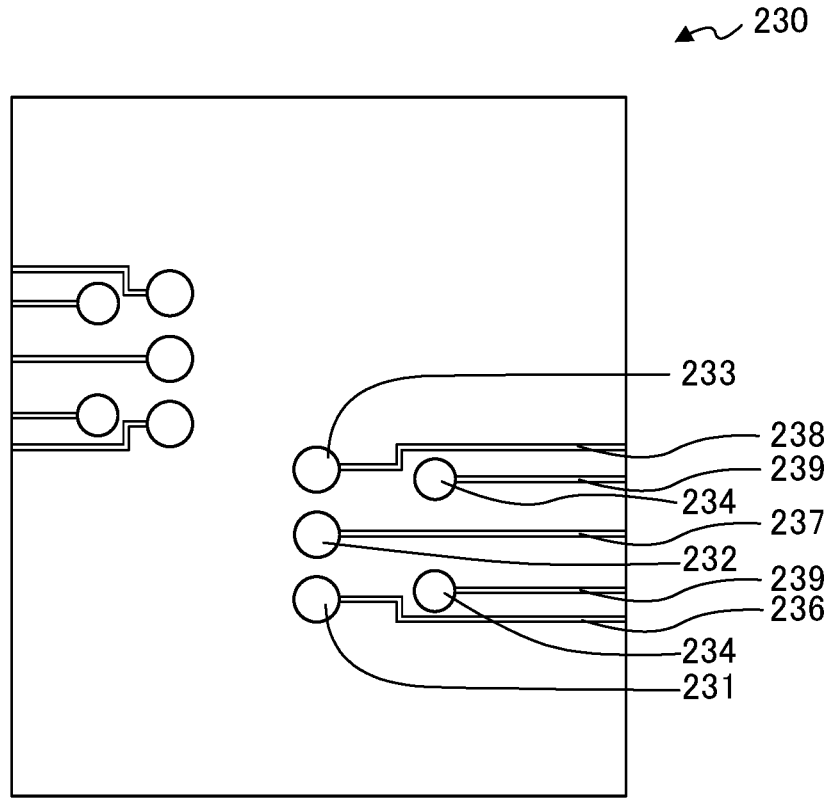
FIG. 9 is a plan view of a second substrate.

FIG. 9 is a plan view of second substrate 230. As illustrated in FIG. 9, second substrate 230 is a substantially rectangular transparent resin substrate. The size of second substrate 230 is not limited. In the present embodiment, second substrate 230 has a size equal to that of first substrate 120. The thickness of second substrate 230 is not limited. The thickness of second substrate 230 is 1 to 10 mm, for example. In addition, the type of resin of second substrate 230 is not limited, and the resin of first substrate 120 may be used.

Second substrate 230 includes first recess 231, second recess 232, third recess 233, fourth recess 234, first communication groove 236, second communication groove 237, third communication groove 238 and fourth communication groove 239.

First recess 231 is communicated with one end of first communication groove 236. Second recess 232 is communicated with one end of second communication groove 237. Third recess 233 is communicated with one end of third communication groove 238. Fourth recess 234 is communicated with one end of fourth communication groove 239. The shapes of first recess 231, second recess 232, third recess 233 and fourth recess 234 are not limited. In the present embodiment, each of first recess 231, second recess 232, third recess 233 and fourth recess 234 has a substantially columnar shape. In addition, the diameters and the depths of first recess 231, second recess 232, third recess 233 and fourth recess 234 are also not limited. In the present embodiment, the diameters and the depths of first recess 231, second recess 232, third recess 233 and fourth recess 234 are identical to each other.

One end of first communication groove 236 is communicated with first recess 231. One end of second communication groove 237 is communicated with second recess 232. One end of third communication groove 238 is communicated with third recess 233. One end of fourth communication groove 239 is communicated with fourth recess 234. In addition, the other ends of communication grooves 236, 237, 238 and 239 open at the side surface of second substrate 230. The other ends of communication grooves 236, 237, 238 and 239 may not open at the side surface of second substrate 230. For example, the other ends of communication grooves 236, 237, 238 and 239 may open at the other of surface of second substrate 230 (whose one surface being a surface on which second film 250 is bonded) through through holes respectively formed on second substrate 230 and communicated with the other ends of communication grooves 236, 237, 238 and 239. When the opening parts of first recess 231, second recess 232, third recess 233, fourth recess 234, first communication groove 236, second communication groove 237, third communication groove 238 and fourth communication groove 239 are closed with second film 250, first pressure chamber 211, second pressure chamber 212, third pressure chamber 213, fourth pressure chamber 214, first communication path 216, second communication path 217, third communication path 218 and fourth communication path 219 are formed.

FIG. 10A to FIG. 10C illustrate a configuration of second film 250. FIG. 10A is a plan view of second film 250, FIG. 10B is a sectional view taken along line I-I of FIG. 10A, and FIG. 10C is a sectional view taken along line J-J of FIG. 10A.

Second film 250 is a substantially rectangular transparent resin film. Second film 250 is bonded on a surface of second substrate 230 on first film 130 side. Second film 250 includes a plurality of diaphragm parts each having a substantially hemispherical shape (fifth diaphragm part 251, sixth diaphragm part 252, seventh diaphragm part 253, eighth diaphragm part 254) (displaceable regions). Fifth diaphragm part 251 is disposed at a position corresponding to first recess 231 on second substrate 230. Sixth diaphragm part 252 is disposed at a position corresponding to second recess 232 on second substrate 230. Seventh diaphragm part 253 is disposed at a position corresponding to third recess 233 on second substrate 230. Eighth diaphragm part 254 is disposed at a position corresponding to fourth recess 234 on second substrate 230. In the state where second film 250 is bonded on second substrate 230, second film 250 (fifth diaphragm part 251, sixth diaphragm part 252, seventh diaphragm part 253 and eighth diaphragm part 254) is put in recesses 231, 232, 233 and 234.

The type of the resin of second film 250 is not limited. For example, the type of the resin of second film 250 may be appropriately selected from the resins for first film 130. As long as second film 250 can function as a valve element (diaphragm), the thickness of second film 250 is not limited and is approximately equal to that of first film 130. In addition, the external shape of second film 250 is appropriately designed so as ensure to a required function. In addition, in plan view, the sizes of fifth diaphragm part 251, sixth diaphragm part 252, seventh diaphragm part 253, eighth diaphragm part 254 are respectively smaller than the sizes of recesses 231, 232, 233 and 234.

(Method of Producing Microchannel Chip)

For example, first chip 110 is produced by joining first film 130 on first substrate 120 by thermo compression bonding. At this time, diaphragm parts 131, 132, 133 and 134 of the joined first film 130 are disposed to protrude from one surface of first substrate 120 (see FIG. 5A and FIG. 5B).

In addition, for example, second chip 210 is produced by joining second film 250 on second substrate 230 by thermo compression bonding. At this time, diaphragm parts 251, 252, 253 and 254 of the joined second film 250 are disposed to be put into respective recesses 231, 232, 233 and 234 from one surface of second substrate 230 (see FIG. 8B).

Finally, first chip 110 and second chip 210 are stacked on each other with first film 130 and second film 250 therebetween such that partition walls 154, 155 and 159 and pressure chambers 211, 213 and 214 respectively face each other. At this time, diaphragm parts 131, 132, 133 and 134 of first film 130 respectively overlap diaphragm parts 251, 252, 253 and 254 of second film 250 (see FIG. 3A to FIG. 3C). In this manner, when first chip 110 and second chip 210 are stacked on each other, gaps are formed between diaphragm parts 131, 132, 133 and 134 and partition walls 154, 155 and 159 and the liquid channel is opened (valve opening state). In this manner, microchannel chip 100 is produced.

(Usage of Microchannel Chip)

Next, a usage of microchannel chip 100 is described. FIG. 11A to FIG. 11D are enlarged views of a region around first channel 152 for describing a usage of microchannel chip 100. It is to be noted that FIG. 11A to FIG. 11D illustrate only first channel 152, second channel 153, third channel 157 and first diaphragm part 131.

First, first chip 110 and second chip 210 are separated from each other to allow liquid to pass through main flow path 141 of first chip 110. For example, fluid such as reagent and liquid sample is provided to reagent inlet 142. By capillarity or external pressure, the fluid flows from reagent inlet 142 to reagent outlet 143 through main flow path 141.

In addition, liquid is allowed to pass through the liquid channel of first chip 110. For example, liquid such as liquid sample is provided to liquid inlet 151. By capillarity or external pressure, the liquid flows through first channel 152 from liquid inlet 151 toward second channel 153.

Figure 11A:
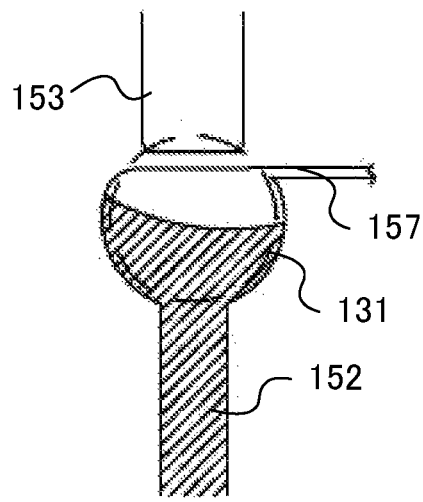
FIG. 11A to FIG. 11D illustrate a usage of the fluid handling device.
Figure 11B:
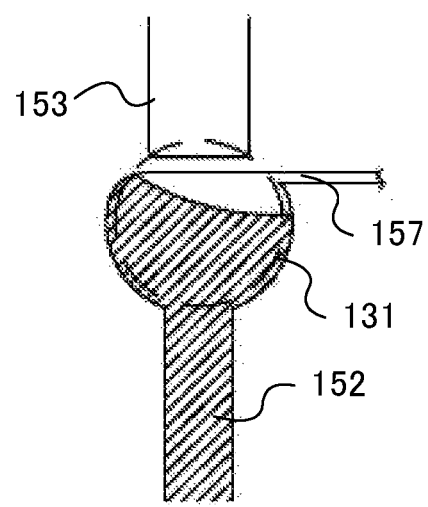
Figure 11C:
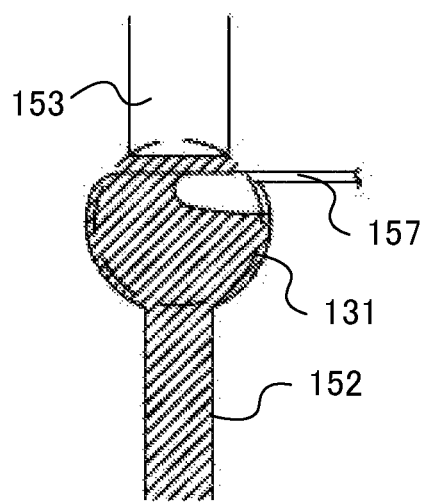
Figure 11D:
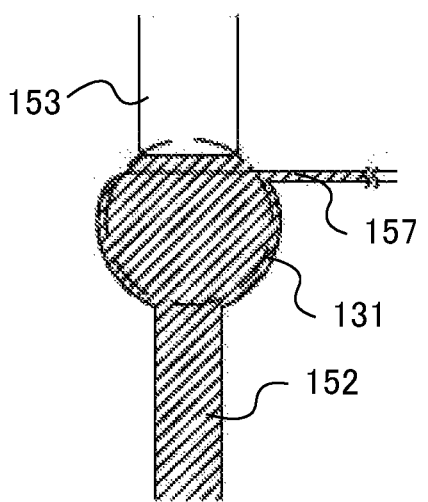

When the liquid is sent to an end portion of first channel 152, the liquid first advances through an outer periphery portion of first channel 152 where capillarity easily occurs (see FIG. 11A). Then, at the end portion of first channel 152, the liquid further advances in such a manner as to turn around along the outer periphery portion of first channel 152 where capillarity easily occurs liquid before the center portion is filled with the liquid, (see FIG. 11B and FIG. 11C).

At this time, the pressure in fourth pressure chamber 214 is not increased, and a gap is formed between first film 130

(fourth diaphragm part 134) and third partition wall 159 and a discharge channel is opened (valve opening state). The bubbles remaining in first channel 152 without being pushed to second channel 153 side are pushed to the discharge channel. When the pressure in fourth pressure chamber 214 is increased after removal of the bubbles from the inside of first channel 152 is confirmed, fourth diaphragm part 134 protruding toward the inside of fourth pressure chamber 214 is pushed. As a result, the shape of fourth diaphragm part 134 is changed, and fourth diaphragm part 134 is pushed toward third partition wall 159. In addition, the timing of increasing the pressure in fourth pressure chamber 214 may be a timing when the liquid filling first channel 152 described later is sent to second channel 153, or other timings as long as the timing is after the bubbles are removed from the inside of first channel 152.

Fourth diaphragm part 134 pushed out from fourth pressure chamber 214 in the above-mentioned manner makes contact with third partition wall 159, and the discharge channel is closed (valve closing state). Thus, the flow of the liquid through the discharge channel is prohibited. Accordingly, the flow of the liquid is stopped. In this manner, it is possible to fill first channel 152 with the liquid without allowing the bubbles to remain in first channel 152.

Although not illustrated in the drawings, when the liquid filling first channel 152 is sent to second channel 153, the pressure in fourth pressure chamber 214 disposed on the downstream side of second channel 153 is released, for example. As a result, the liquid in first channel 152 flows into second channel 153. The liquid reaching an end portion of second channel 153 first advances through the outer periphery portion of second channel 153 where capillarity easily occurs. Then, at the end portion of second channel 153, the liquid further advances in such a manner as to turn around along the outer periphery portion of second channel 153 where capillarity easily occurs before the center portion is filled with the liquid.

At this time, the pressure in fourth pressure chamber 214 which acts on second channel 153 is not increased, and a gap is formed between first film 130 (fourth diaphragm part 134) and third partition wall 159 (valve opening state). The bubbles remaining in second channel 153 without being pushed to main flow path 141 side are pushed to the discharge channel. When the pressure in fourth pressure chamber 214 is increased after removal of bubbles from the inside of second channel 153 is confirmed, the gap between fourth diaphragm part 134 and third partition wall 159 is closed (valve closing state). Thus, the flow of the liquid through the discharge channel is prohibited. Accordingly, the flow of the liquid is stopped. In this manner, it is possible to fill first channel 153 with the liquid without allowing the bubbles to remain in first channel 153. In addition, the timing of increasing the pressure in fourth pressure chamber 214 of second channel 153 side may be a timing when the liquid filling second channel 153 described later is sent to main flow path 141, or other timings as long as the timing is after the bubbles are removed from the inside of second channel 153.

To allow the liquid of second channel 153 to flow through main flow path 141, the pressure in second pressure chamber 212 is increased with the pressure in first pressure chamber 211 increased, and the pressure in third pressure chamber 213 is released. In this manner, a certain amount of liquid can be sent into main flow path 141 from second channel 153. In addition, to stop the supply of liquid to main flow path 141, the pressure in first pressure chamber 211 and the pressure in second pressure chamber 212 are released with the pressure in third pressure chamber 213 increased. In this manner, the liquid again flows into second channel 153 from first channel 152, and second channel 153 is filled with the liquid.

Through the above-mentioned procedures, filling of first channel 152 and second channel 153 with the liquid, flowing of liquid from second channel 153 to main flow path 141, and stopping of flow of liquid from second channel 153 to main flow path 141 can be performed at any timing. For example, it is possible to cause a reaction between a reagent flowing through main flow path 141 and another reagent after a reaction between a reagent and a specific reagent is caused for a certain period in reagent inlet 142.

(Effect)

In microchannel chip 100 of the present embodiment, bubbles in first channel 152 and second channel 153 are sent to the discharge channel, and thus first channel 152 and second channel 153 can be surely filled with liquid without allowing the bubbles to remain in first channel 152 or second channel 153.

Figure 12A:
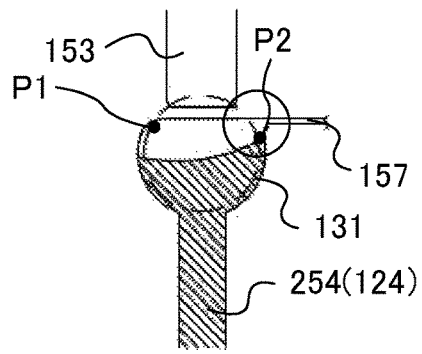
FIG. 12A to FIG. 12E illustrate another usage of the fluid handling device.
Figure 12B:
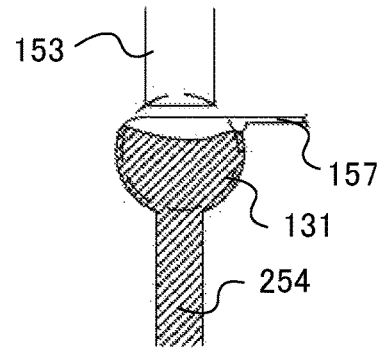
Figure 12C:
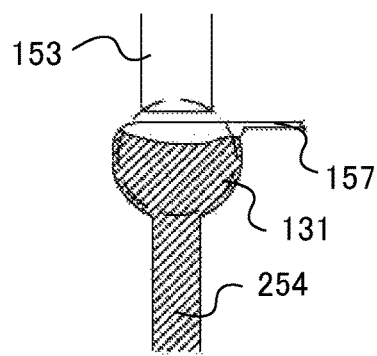
Figure 12D:
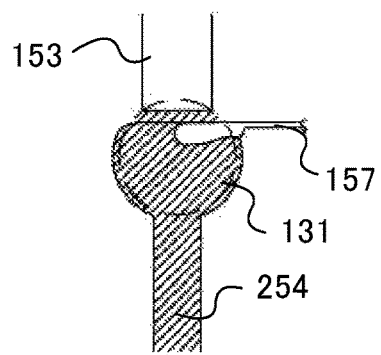
Figure 12E:
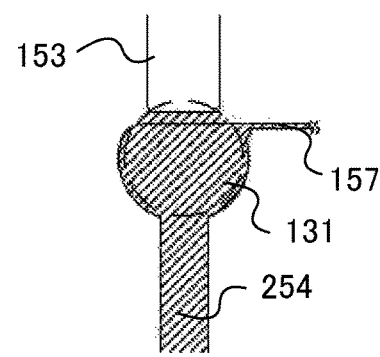

It is to be noted that the connecting portion between first groove 124 and third groove 127 may be chamfered (see, the region surrounded with solid line in FIG. 12A). In this manner, as illustrated in FIG. 12A to FIG. 12E, when the liquid reaches the position of point P2, the liquid reaching the position from point P2 side does not flow into third channel 157. Thus, the liquid further advances in such a manner as to turn around along the outer periphery portion on P1 side where the distance between first film 130 and the bottom surface of first groove 124 is small. Accordingly, the effect of removal of bubbles is facilitated.

[Modification]

(Configuration of Microchannel Chip)

Microchannel chip 300 according to a modification of Embodiment 2 differs from ejection part 156 of microchannel chip 100 according to Embodiment 1 in that first channel 152 is communicated with two discharge channels. In view of this, components same as those of microchannel chip 100 according to Embodiment 1 are denoted with the same reference numerals and description thereof is omitted, and, only components of microchannel chip 300 different from those of microchannel chip 100 are described.

FIG. 13A to FIG. 13C illustrate a configuration of ejection part 356 of microchannel chip 300 according to the modification of Embodiment 1. FIG. 13A is a plan view of a region around ejection part 356 in microchannel chip 300, FIG. 13B is a sectional view taken along line K-K of FIG. 13A, and FIG. 13C is a sectional view taken along line L-L of FIG. 13A.

As illustrated in FIG. 13A to FIG. 13C, microchannel chip 300 according to the modification of Embodiment 1 includes first chip 310 including first substrate 320 and first film 330, and second chip 410 including second substrate 430 and second film 450.

First chip 310 includes main channel part 140 and addition part 350. In addition, addition part 350 includes liquid inlet 151, first channel 152, second channel 153, a plurality of partition walls 154, 155 and a plurality of ejection parts 356.

Ejection part 356 includes fifth channel 351, sixth channel 352 and fourth partition wall 353 in addition to third channel 157, fourth channel 158, and third partition wall 159. The discharge channel having third channel 157, fourth channel 158, fifth channel 351 and sixth channel 352 is continuously connected with a micro valve (valve) for opening and closing between the inside and outside of first channel 152.

The upstream end of third channel 157 is communicated with first channel 152, and the downstream side thereof is branched. Third partition wall 159 is disposed at one of the branched ends on the downstream side.

With respect to a surface which passes through an axis (see line K-K of FIG. 13A) parallel to a direction in which the liquid flows in first channel 152 and is perpendicular to the surface of first substrate 320, the upstream end of fifth channel 351 opens at a position which is plane symmetrical with the upstream end of third channel 157. The upstream end of fifth channel 351 is communicated with first channel 152. In addition, the downstream end of fifth channel 351 is communicated with third channel 157. Sixth channel 352 is disposed so as to adjacent to fifth channel 351 with fourth partition wall 353 therebetween. The other end of sixth channel 352 opens at a side surface of first substrate 320. Alternatively, the other end of sixth channel 352 may open to the outside through a through hole formed to communicate with the other end of sixth channel 352 on first substrate 320.

First substrate 320 includes fifth groove 354, sixth groove 355 and fourth partition wall 353 in addition to main groove 121, through holes 122, 123 and 126, grooves 124, 125, 127 and 128, and partition walls 154, 155 and 159. When the opening parts of fifth groove 354 and sixth groove 355 are closed with first film 330, fifth channel 351 and sixth channel 352 are formed (see FIG. 13B and FIG. 13C).

First film 330 includes ninth diaphragm part 331 having a substantially spherical cap shape in addition to diaphragm parts 131, 132, 133 and 134. Ninth diaphragm part 331 is disposed at a position corresponding to fourth partition wall 353 in first film 330.

Second chip 410 is composed of second substrate 430 and second film 450. Second chip 410 includes fifth pressure chamber 411 and fifth communication path 412 in addition to pressure chambers 211, 212, 213 and 214, and communication paths 216, 217, 218 and 219. One end of fifth communication path 412 is communicated with fifth pressure chamber 411. In addition, the other end of fifth communication path 412 opens at a side surface of second substrate 430.

Second substrate 430 includes fifth recess 413 and fifth communication groove 414 in addition to recesses 231, 232, 233 and 234 and communication grooves 236, 237, 238 and 239. Fifth recess 413 is communicated with one end of fifth communication groove 414. When the opening part of fifth communication groove 414 and the opening part of fifth recess 413 are closed with second film 450, fifth communication path 412 and fifth pressure chamber 411 are formed (see FIG. 13B and FIG. 13C).

Second film 450 includes tenth diaphragm part 451 having a substantially spherical cap shape in addition to diaphragm parts 251, 252, 253 and 254. Tenth diaphragm part 451 is disposed at a position corresponding to fourth partition wall 353. In addition, in plan view, tenth diaphragm part 451 has a size smaller than the size of fifth recess 413. In the state where second film 450 is bonded on second substrate 430, second film 450 is separated from fourth partition wall 353.

(Usage of Microchannel Chip)

Next, a usage of microchannel chip 300 is described. FIG. 14A to FIG. 14D are enlarged views of a region around first channel 152 for describing usage of microchannel chip 300. It is to be noted that in FIG. 14A to FIG. 14D illustrate only first channel 152, second channel 153, third channel 157, first diaphragm part 131 and fifth channel 351.

Figure 14A:
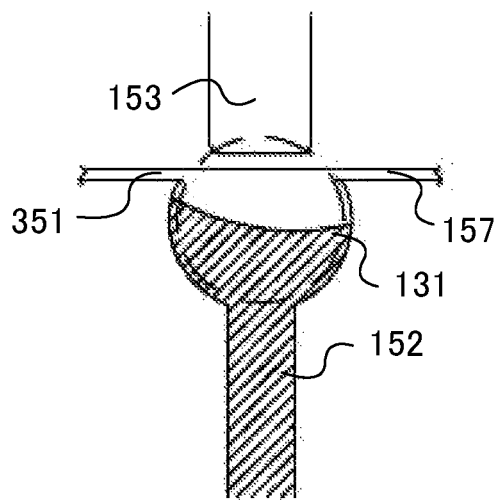
FIG. 14A to FIG. 14D illustrate a usage of the fluid handling device according to the modification of Embodiment 1.
Figure 14B:
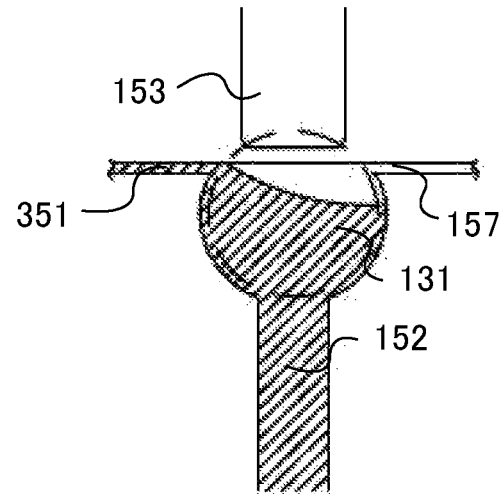
Figure 14C:
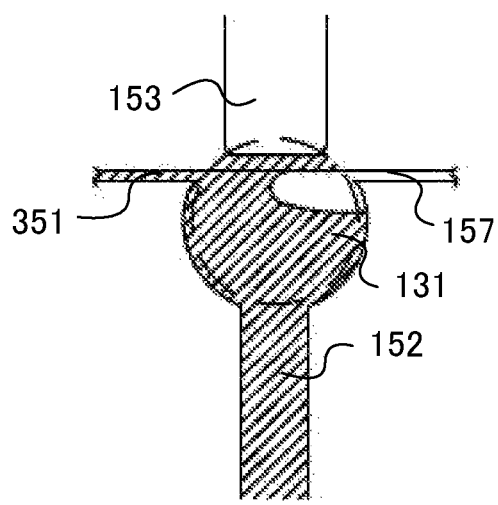
Figure 14D:
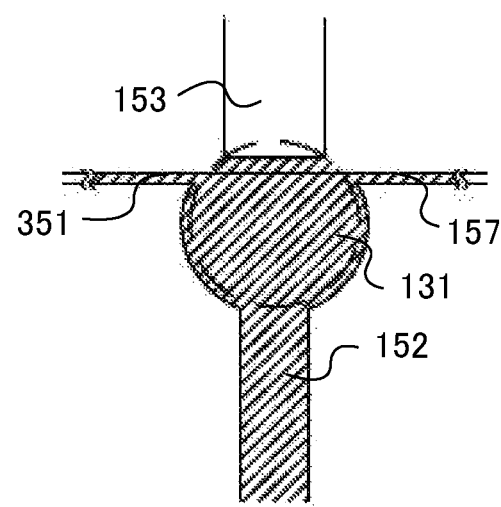

When the liquid is sent to the end portion of first channel 152 after the liquid is supplied to main flow path 141 of first chip 310, the liquid first advances through the outer periphery portion of first channel 152 where capillarity easily occurs (see FIG. 14A). Then, the liquid reaching fifth channel 351 flows through fifth channel 351 and, before the center portion is filled with the liquid, the liquid further advances in such a manner as to turn around along the outer periphery portion of first channel 152 where capillarity easily occurs (see FIG. 14B and FIG. 14C).

At this time, the pressure in fourth pressure chamber 214 is increased to press first film 330 (fourth diaphragm part 134) against third partition wall 159 (valve close state). Meanwhile, the pressure in fifth pressure chamber 411 is not increased, and a gap is formed between first film 330 (ninth diaphragm part 331) and fourth partition wall 353 (valve opening state). In this manner, bubbles can be removed from both of third channel 157 and fifth channel 351.

In addition, the pressure in fifth pressure chamber 411 is increased to press first film 330 (ninth diaphragm part 331) against fourth partition wall 353 (valve close state). Alternatively, it is also possible to form a gap between first film 330 (ninth diaphragm part 331) and fourth partition wall 353 (valve opening state,) to remove bubbles without increasing the pressure in fourth pressure chamber 214.

(Effect)

As described above, since channels 157 and 351 are connected to the both side walls of the end portion of first channel 152, bubbles can be surely removed from the liquid channels even when the liquid first reaches third channel 157 and when the liquid first reaches fifth channel 351 at the end portion of first channel 152.

Embodiment 2

(Configuration of Microchannel Chip)

Microchannel chip 500 according to Embodiment 2 differs from ejection part 156 according to Embodiment 1 in that discharge hole 557 is provided in place of the discharge channel. In view of this, the component same as those of microchannel chip 100 according to Embodiment 1 are denoted with the same reference numerals and descriptions thereof are omitted, and, components of microchannel chip 500 different from those of microchannel chip 100 are mainly described below.

Figure 15A:
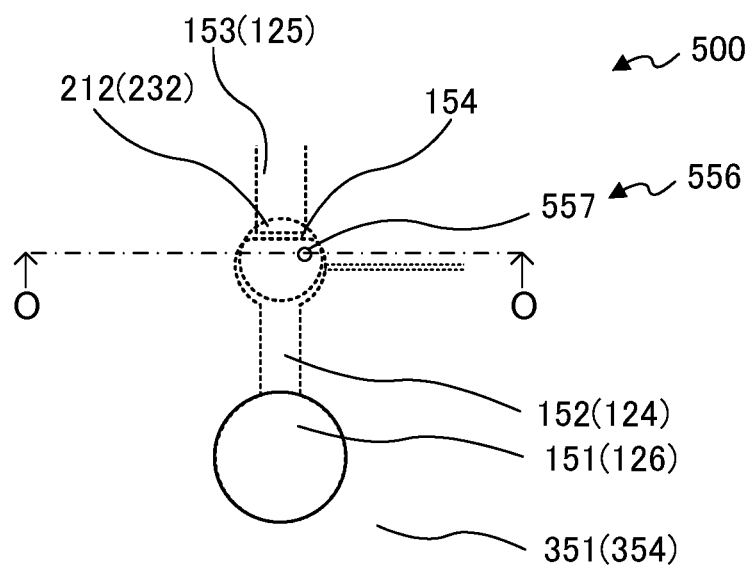
FIG. 15A and FIG. 15B illustrate a configuration of a fluid handling device according to Embodiment 2.
Figure 15B:
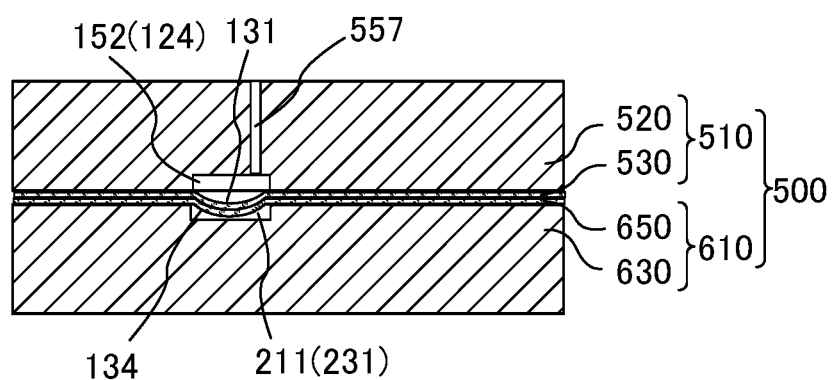

FIG. 15A and FIG. 15B illustrate a configuration of ejection part 556 of microchannel chip 500 according to Embodiment 2. FIG. 15A is a plan view of a region around first channel 152, and FIG. 15B is a sectional view taken along line O-O of FIG. 15A.

As illustrated in FIG. 15A, microchannel chip 500 according to Embodiment 2 includes first chip 510 having first substrate 520 and first film 530, and second chip 610 having second substrate 630 and second film 650.

First chip 510 includes first substrate 520, first film 530, main channel part 140 and ejection part 556.

Ejection part 556 removes bubbles from first channel 152 and second channel 153. The number of ejection part 556 is not limited. In the present embodiment, ejection part 556 is connected with the downstream end part of first channel 152, and with the downstream end part of second channel 153. It is to be noted that the downstream end part of first channel 152 connected with ejection part 556, and the downstream end part of second channel 153 connected with ejection part 556 have the configuration. For such a configuration, the downstream end part of first channel 152 connected with ejection part 556 is described below.

Ejection part 556 includes discharge hole 557 and an opening/closing jig. The shape of discharge hole 557 is not limited. The shape of discharge hole 557 may be a columnar shape or a rectangular prism shape. In the present embodiment, discharge hole 557 has a columnar shape. One opening part of discharge hole 557 is disposed at the bottom surface of first groove 124, and the other opening part is disposed at the side surface or the rear surface of first substrate 520. To be more specific, one opening part of discharge hole 557 is disposed between the center of first diaphragm part 131 and first partition wall 154 in a direction of liquid flow in first channel 152. The position of discharge hole 557 in the width direction of first channel 152 is not limited. The position of discharge hole 557 in the width direction of first channel 152 may be a center portion of the bottom surface of the first groove, or a region of the side surface side (end portion) of first groove 124. In the present embodiment, discharge hole 557 is disposed in a region on the side surface side relative to the center of the first groove 124 on the bottom surface of first groove 124. The cross-sectional area and the cross-sectional shape of discharge hole 557 are not limited as long as bubbles can move.

Although not illustrated in the drawings, the opening/closing jig opens and closes discharge hole 557 opening at the side surface or the bottom surface of second substrate 630. The opening/closing jig is disposed on the side of a surface (rear surface) opposite to the surface on which first chip 510 is disposed.

(Usage of Microchannel Chip)

Next, a usage of microchannel chip 500 is described. FIG. 16A to FIG. 16D are plan views of a region around first channel 152 for describing a usage of microchannel chip 500. It is to be noted that FIG. 16A to FIG. 16D illustrate only first channel 152, second channel 153, first diaphragm part 131 and discharge hole 557.

Figure 16A:
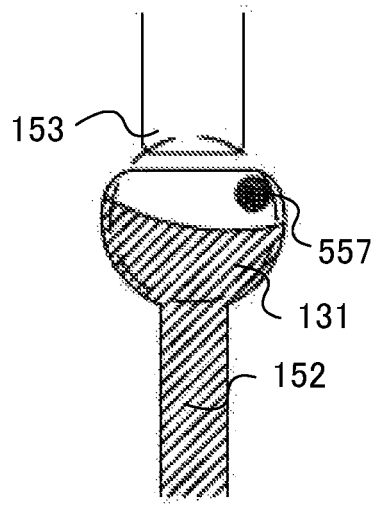
FIG. 16A to FIG. 16D illustrate a usage of the fluid handling device according to Embodiment 2.
Figure 16B:
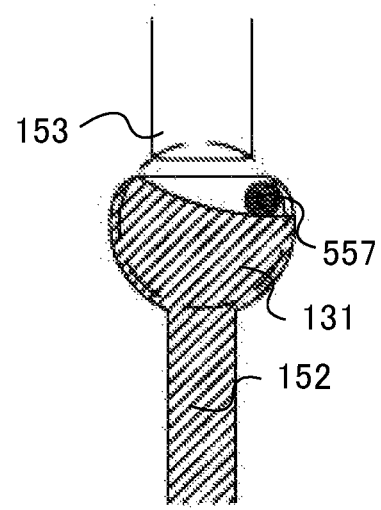
Figure 16C:
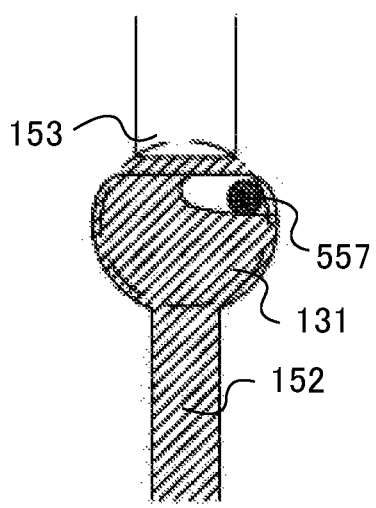
Figure 16D:
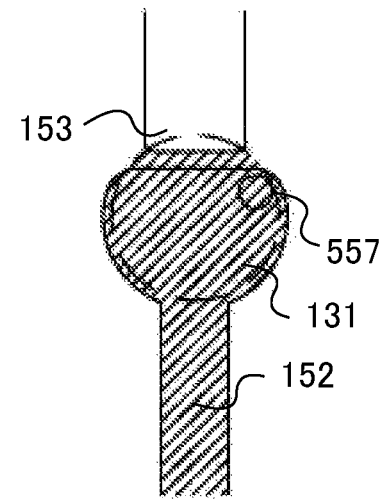

When liquid is sent to the end portion of first channel 152 after the liquid is supplied to flow through main flow path 141 of first chip 510, the liquid first advances through the outer periphery portion of first channel 152 where capillarity easily occurs (see FIG. 16A). Then, before the center portion is filled with the liquid, the liquid further advances in such a manner as to turn around along the outer periphery portion of first channel 152 where capillarity easily occurs (see FIG. 16B and FIG. 16C).

At this time, the opening/closing jig opens the opening part of discharge hole 557. The bubbles remaining in first channel 152 without being pushed to second channel 153 side are pushed to the outside through discharge hole 557. After removal of bubbles from the inside of first channel 152 is confirmed, the opening part formed on the bottom surface of first substrate 520 is closed with the opening/closing jig. In this manner, it is possible to fill first channel 152 with the liquid.

(Effect)

As described above, since discharge hole 557 is formed on the bottom surface of first channel 152, bubbles can be surely removed from first channel 152.

It is to be noted that, in the state where the first chip and the second chip are stacked on each other, a gap may be formed between the diaphragm part and the partition wall, thus opening the liquid channel. In this case, the second film is formed in a planar shape. In addition, when fluid flows out from the pressure chamber (recess) and the pressure in the recess becomes a negative pressure, the second film covering the recess is sucked into the recess, and the diaphragm part bends toward the recess. As a result, a gap is formed between the first film and the partition wall and the liquid channel is opened. In addition, when the pressure in the recess is released, the shape of the diaphragm part sucked into the recess is returned to the original shape, and the diaphragm part and the partition wall make contact with each other, thus closing the liquid channel.

In addition, in the state where the first chip and the second chip are stacked on each other, fourth diaphragm part 134 and third partition wall 159 and tenth diaphragm part 451 and fourth partition wall 353 may make contact with each other to close the discharge channel (valve). In this case, the second film is formed in a planar shape.

This application is entitled to and claims the benefit of Japanese Patent Application No. 2014-023510 filed on Feb. 10, 2014, the disclosure each of which including the specification, drawings and abstract is incorporated herein by reference in its entirety.

INDUSTRIAL APPLICABILITY

The fluid handling device of the embodiments of the present invention is useful for a microchannel chip which is used in the scientific field, medical field, and the like, for example.

REFERENCE SIGNS LIST

10 Micro valve
20 Substrate
30 First layer
31 First groove
32 First valve groove
33 Second groove
34 Second valve groove
35 Valve
36 First channel
37 First valve chamber
38 Second valve chamber
39 Second channel
40 Second layer
41 Recess
42 Pressure chamber
100, 300, 500 Microchannel chip
110, 310, 510 First chip
120, 320, 520 First substrate
121 Main groove
122 First through hole
123 Second through hole
124 First groove
125 Second groove
126 Third through hole
127 Third groove
128 Fourth groove
130, 330, 530 First film
131 First diaphragm part
132 Second diaphragm part
133 Third diaphragm part
134 Fourth diaphragm part
140 Main channel part
141 Main flow path
142 Reagent inlet
143 Reagent outlet
150, 350 Addition part
151 Liquid inlet
152 First channel
153 Second channel
154 First partition wall
155 Second partition wall 156, 356, 556 Ejection part
157 Third channel
158 Fourth channel
159 Third partition wall
210, 410, 610 Second chip
211 First pressure chamber
212 Second pressure chamber
213 Third pressure chamber
214 Fourth pressure chamber
216 First communication path
217 Second communication path
218 Third communication path
219 Fourth communication path
230, 430, 630 Second substrate
231 First recess
232 Second recess
233 Third recess
234 Fourth recess
236 First communication groove
237 Second communication groove
238 Third communication groove
239 Fourth communication groove
250, 450, 650 Second film
251 Fifth diaphragm part
252 Sixth diaphragm part
253 Seventh diaphragm part
254 Eighth diaphragm part
331 Ninth diaphragm part
351 Fifth channel
352 Sixth channel
353 Fourth partition wall
354 Fifth groove
355 Sixth groove
411 Fifth pressure chamber
412 Fifth communication path
413 Fifth recess
414 Fifth communication groove
451 Tenth diaphragm part
557 Discharge hole

The invention claimed is:

1. A liquid handling device comprising:
a first chip,
the first chip including:
a first substrate having, on one surface thereof, a first groove located on an upstream side in a direction in which liquid flows, a second groove located on a downstream side in the direction in which liquid flows, and a partition wall disposed between the first groove and the second groove, and
a first film configured to cover the partition wall, one end of the first groove on the partition wall side, and one end of the second groove on the partition wall side, and including a diaphragm part whose center is located on the first groove, the diaphragm part having a circular shape in plan view, the first film being bonded on the one surface of the first substrate except for the diaphragm part, wherein:
a liquid channel, and a discharge hole or a discharge channel are formed in the first chip,
the liquid channel includes
a first channel disposed on the first groove side and configured of the first groove, the partition wall and the first film, and
a second channel disposed on the second groove side and configured of the second groove, the partition wall and the first film, wherein the second channel communicates with the first channel via a gap between the partition wall and the diaphragm part when the diaphragm part is not in contact with the partition wall and a communication between the second channel and the first channel is shut off when the diaphragm part is in contact with the partition wall, and
the discharge hole or the discharge channel is configured to open at the first channel between the center of the diaphragm part and the partition wall in a direction in which liquid flows in the first channel, and communicates between the first channel and outside of the liquid channel.

2. The liquid handling device according to claim 1, wherein:
the discharge hole is a through hole configured to communicate between a bottom surface of the first groove and another surface of the first substrate; and
the discharge hole opens in a region nearer to a side surface than a center of the bottom surface of the first groove in a direction orthogonal to the direction in which the liquid flows in the first channel.

3. The liquid handling device according to claim 1 further comprising:
a second chip including a second substrate having a recess on one surface thereof and a second film bonded on the one surface of the second substrate, wherein:
the first chip and the second chip are stacked on each other with the first film and the second film therebetween such that the partition wall and the recess face each other,
the gap is formed between the diaphragm part and the partition wall and the liquid channel is in an opened state wherein the first chip and the second chip are stacked on each other, and
the second film covering the recess and the first film facing the second film are pushed toward the partition wall and the diaphragm part makes contact with the partition wall to close the liquid channel when fluid is supplied into the recess.

4. The liquid handling device according to claim 1 further comprising:
a second chip including a second substrate having a recess on one surface thereof and a second film bonded on the one surface of the second substrate, wherein:
the first chip and the second chip are stacked on each other with the first film and the second film therebetween such that the partition wall and the recess face each other,
the diaphragm part and the partition wall are in contact with each other and the liquid channel is in a closed state wherein the first chip and the second chip are stacked on each other, and,
when fluid is ejected out of the recess and a pressure in the recess is set to a negative pressure, the second film covering the recess is sucked into the recess, and the diaphragm part bends toward the recess to form the gap between the first film and the partition wall and open the liquid channel.

5. The liquid handling device according to claim 1, further comprising a valve disposed in the discharge channel,
wherein the discharge channel is communicating with the first channel and the outside of the liquid channel via the valve, the outside of the liquid channel being outside of the first substrate.

6. The liquid handling device according to claim 5 further comprising a second chip including a second substrate and a second film bonded on one surface of the second substrate, wherein:

the first chip and the second chip are stacked on each other with the first film and the second film therebetween such that the first chip and the second chip face each other; and the valve is in a closed state wherein the first chip and the second chip are stacked on each other.

* * * * *